US012579473B2

(12) United States Patent
Sinha et al.

(10) Patent No.: US 12,579,473 B2
(45) Date of Patent: Mar. 17, 2026

(54) REQUIREMENTS DRIVEN MACHINE LEARNING MODELS FOR TECHNICAL CONFIGURATION

(71) Applicant: SAP SE, Walldorf (DE)

(72) Inventors: Akshay Sinha, Bangalore (IN);
Matthias Hirsch, Guntersblum (DE);
Mitchell Clark, Alexandria, VA (US)

(73) Assignee: SAP SE, Walldorf (DE)

( * ) Notice: Subject to any disclaimer, the term of this patent is extended or adjusted under 35 U.S.C. 154(b) by 489 days.

(21) Appl. No.: 18/116,793

(22) Filed: Mar. 2, 2023

(65) Prior Publication Data
US 2024/0296375 A1 Sep. 5, 2024

(51) Int. Cl.
G06N 20/00 (2019.01)
(52) U.S. Cl.
CPC ..................................... G06N 20/00 (2019.01)
(58) Field of Classification Search
CPC ..................................................... G06N 20/00
See application file for complete search history.

(56) References Cited

U.S. PATENT DOCUMENTS 6,026,393 A * 2/2000 Gupta ................. G06F 11/2257
706/50
7,970,722 B1 * 6/2011 Owen .................... G06N 20/00
706/46

OTHER PUBLICATIONS

Final Office Action received in U.S. Appl. No. 18/116,792, Jan. 8, 2026, 13 pages.

* cited by examiner

*Primary Examiner* — Masud K Khan
(74) *Attorney, Agent, or Firm* — Klarquist Sparkman, LLP

(57) ABSTRACT

Techniques and solutions are provided for obtaining a suggested configuration for a configurable object. Typically, a particular object and object configuration are recommended based on technical characteristics of the object. However, a user or process wishing to obtain a recommendation may be more familiar with their operational requirements. Disclosed techniques can include an overall solutions category containing solutions of different solutions category subtypes. Sets of requirements attributes and configuration (technical) attributes can be defined for the solutions category. In some cases, a first machine learning model is trained using input values for the requirements attributes and the configuration attributes, and is used to recommend a particular solution in response to a set of input requirement attribute values. Different machine learning models can be trained for the various solutions, including using the configuration attributes for a particular solution, and can be used to recommend a configuration of a selected/recommend solution.

20 Claims, 34 Drawing Sheets

700 ⟶

Product Needs
Attributes

Product Category

Category:
Industrial Robots
Operating Environment:
Industry Sector:
Automotive
Country of Installation:
Mexico
Task Description
Application:
Painting
Number of Cars per Hour
(Normal Operation Mode):
10 cars/hour
Number of Cars per Hour
(Full Load Operation):
15 cars/hour
Production Plant Attributes
Available Installation Space:
2500 Sq. Feet
Width of Paint & Assemble Line:
20 Feet
Load to Carry:
7 lbs
Mounting Position
Floor
...

Matching Products

Products (3)

Robot Type

Low Payload Robot –
IMC 6000

Operations Reliability & Meantime
Between Failures: 320 Days

10Y Total Cost of Ownership: 1296MIO $
10Y Product Lifecycle $CO_2$ Footprint: 725 Tons Medium Payload Robot –
IMC 7000

Operations Reliability & Meantime
Between Failures: 250 Days

10Y Total Cost of Ownership: 1513MIO $
10Y Product Lifecycle $CO_2$ Footprint: 680 Tons

High Payload Robot –
IMC 8000            ☆

Operations Reliability & Meantime
Between Failures: 150 Days

10Y Total Cost of Ownership: 0.973 MIO $
10Y Product Lifecycle $CO_2$ Footprint: 520 Tons

Optimal Configuration

710 ⟶

Reach: 1.2 feet
Maximum Rate Payload: 35 lbs
Wirst: In Line Wirst 60
Axis 1 Speed: 117 deg/sec
Axis 2 Speed: 104 deg/sec
Axis 3 Speed: 152 deg/sec
Axis 4 Speed 200 deg/sec
Axis 5 Speed 211 deg/sec
Axis 6 Speed: 296 deg/sec Accessories:
Energy Supply System A3
Electronic Probe
Tension Measurement Device

| Doc Type | Doc Date | Country of Installation | Series | End Effector Configuration | Power Supply | Voltage | Proximity Alarm | Vision System | External Axis Kit | Mounting Position | Payload | IP Protection Class |
|---|---|---|---|---|---|---|---|---|---|---|---|---|
| Sales Order | 09/16/16 | Germany | XT45 | European | 400V/3Ph/50 | 230 | Yes | No | No | Wall | 50 kg | IP45 |
| Sales Order | 09/16/16 | Ukraine | LT80 | European | 400V/3Ph/50 | 230 | No | No | No | Wall | 50 kg | IP65 |
| Sales Order | 09/16/16 | Ukraine | FX_20 | European | 230V/3Ph/50 | 230 | Yes | No | No | Wall | 50 kg | IP65 |
| Sales Order | ####### | Ukraine | XT45 | European | 400V/3Ph/50 | 230 | No | No | No | Ceiling | 50 kg | IP67 |
| Sales Order | 09/16/16 | Japan | XT45 | Japan | 380V/3Ph/60 | 230 | No | No | No | Ceiling | 50 kg | IP67 |
| Sales Order | 09/16/16 | Japan | IMC_7000 | Japan | 400V/3Ph/50 | 230 | No | No | No | Ceiling | 80 kg | IP67 |
| Quotation | 09/16/16 | USA | IMC_3000 | USA | 400V/3Ph/50 | 115 | No | No | No | Ceiling | 50 kg | IP67 |
| Quotation | 09/16/16 | USA | LT80 | USA | 230V/3Ph/50 | 230 | No | No | No | Wall | 50 kg | IP65 |
| Sales Order | 09/16/16 | USA | P_500 | USA | 208/230/460V | 115 | No | No | No | Ceiling | 45 kg | IP65 |
| Sales Order | 09/16/16 | France | IMC_3000 | European | 575V/3Ph/60 | 230 | No | No | No | Ceiling | 50 kg | IP67 |
| Quotation | 09/16/16 | Canada | XT45 | Canada | 400V/3Ph/50 | 230 | Yes | Yes | No | Ceiling | 50 kg | IP67 |
| Sales Order | 09/16/16 | France | RBT_100 | European | 400V/3Ph/50 | 230 | No | No | Yes | Ceiling | 50 kg | IP67 |
| Sales Order | 09/16/16 | Canada | IMC_5000 | Canada | 400V/3Ph/50 | 230 | No | No | No | Wall | 50 kg | IP67 |
| Quotation | 09/16/16 | Germany | LT80 | European | 380V/3Ph/60 | 230 | No | Yes | No | Wall | 50 kg | IP65 |
| Quotation | 09/16/16 | Germany | IMC_6000 | European | 208/230/460V | 115 | No | No | No | Ceiling | 80 kg | IP67 |
| Quotation | 09/16/16 | Japan | IMC_1000 | Japan | 400V/3Ph/50 | 230 | Yes | No | No | Ceiling | 50 kg | IP67 |
| Sales Order | ####### | Ukraine | IMC_5000 | European | 400V/3Ph/50 | 230 | No | No | No | Ceiling | 50 kg | IP67 |
| Sales Order | 09/16/16 | Germany | XT45 | European | 400V/3Ph/50 | 230 | No | Yes | Yes | Ceiling | 65 kg | IP67 |
| Sales Order | 09/16/16 | Germany | IMC_7000 | European | 208/230/460V | 230 | No | No | No | Wall | 80 kg | IP45 |
| Sales Order | 09/16/16 | India | RBT_100 | European | 230V/3Ph/50 | 230 | No | Yes | No | Ceiling | 50 kg | IP67 |

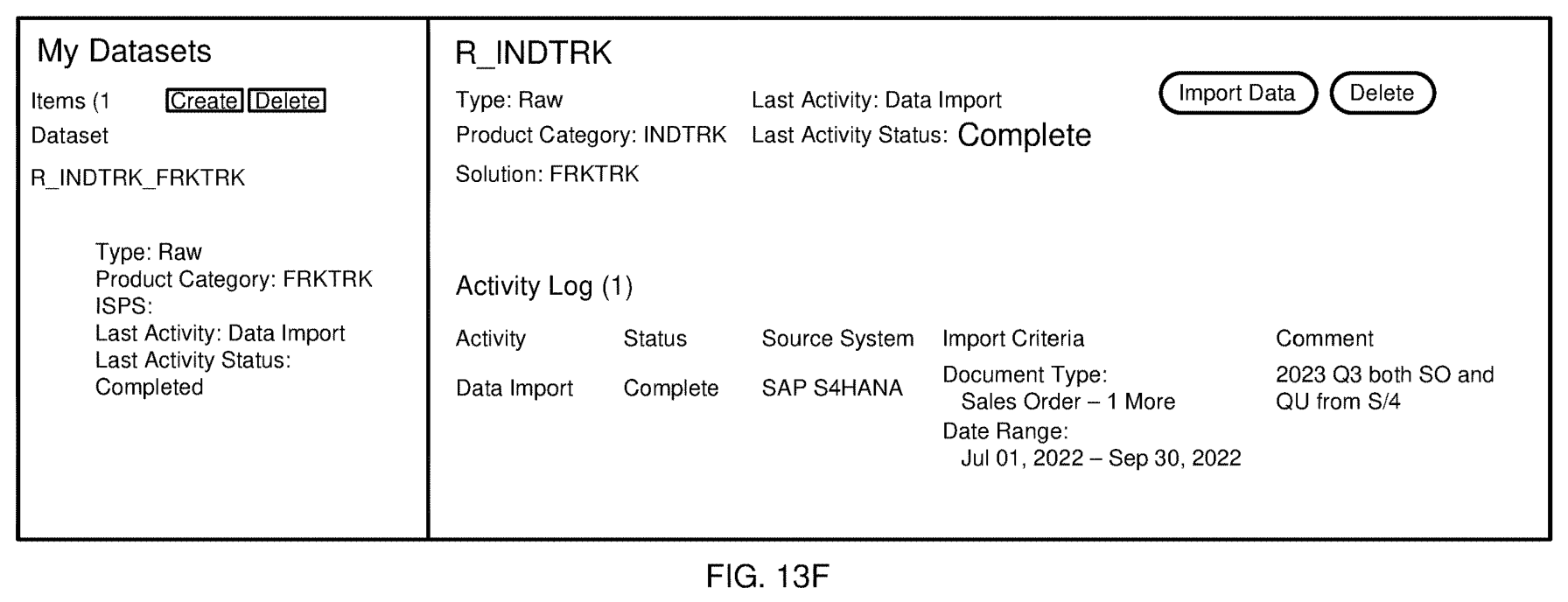

My Datasets

Items (1   Create   Delete

Dataset

R_INDTRK_FRKTRK

Type: Raw
Product Category: FRKTRK
ISPS:
Last Activity: Data Import
Last Activity Status:
Completed

R_INDTRK

Type: Raw     Last Activity: Data Import

Product Category: INDTRK     Last Activity Status: Complete

Solution: FRKTRK

Import Data    Delete

Activity Log (1)

| Activity | Status | Source System | Import Criteria | | Comment |
|---|---|---|---|---|---|
| Data Import | Complete | SAP S4HANA | Document Type: Sales Order – 1 More | | 2023 Q3 both SO and QU from S/4 |
| | | | Date Range: Jul 01, 2022 – Sep 30, 2022 | | |

FIG. 13F

My ML Profiles

Items (1)

| ML Profiled | Product Category | Count of ML Models |
|---|---|---|
| DRONES_2022v1_MP | Drones (DRONES) | 15 |

Create ML Profile

ML Profile:
INROBOT_22V1_MP

Description:
ML Profile for Industrial Robots

Product Category:
Industrial Robots (INDTRK)

RP:
INROBOT_22022

( Create )    ( Cancel )

FIG. 13G

Machine Learning Profile

INROBOT_2022V1_M

ML Profile for Industrial Robots

| Product Category: Industrial Robots (INDTRK) | ML Profile Status |
|---|---|
| RP: INROBOT_2022 | Created |

Determination Model Overview (3)

| Determination Target | Has a Deployed ML Model? | Count of ML Models |
|---|---|---|
| Industrial Robots (INDROB) | No | 0 |
| Robot Work Cells (ROBWCE) | No | 0 |
| Industrial Robots (INDTRK) | No | 0 |

FIG. 13H

MLPRF_INDTRK

ML Profile for Industrial Truck

Product Category: INDTRK
RP: RPFRKTRK

ML Profile Status
Published

Determination Model Overviews (3)

| Target | Has a Deployed ML Model? |
|---|---|
| FRKTRK | Yes |
| SDELDR | Yes |
| INDTRK | Yes |

Determination ML Model for Industrial Trucks (INDTRK)

Items (1)          ( Create )  ( Train )  ( Deploy )  ( Undeploy )  ( Delete )

| ML Model | Data Set | ML Model Status | F1 Score | Precision | Recall |
|---|---|---|---|---|---|
| MLPRF_INDT_INDTRK_151222180156<br>Model for Industrial Truck | 2 Items | Deployed | 0.61 | 0.53 | 0.72 |

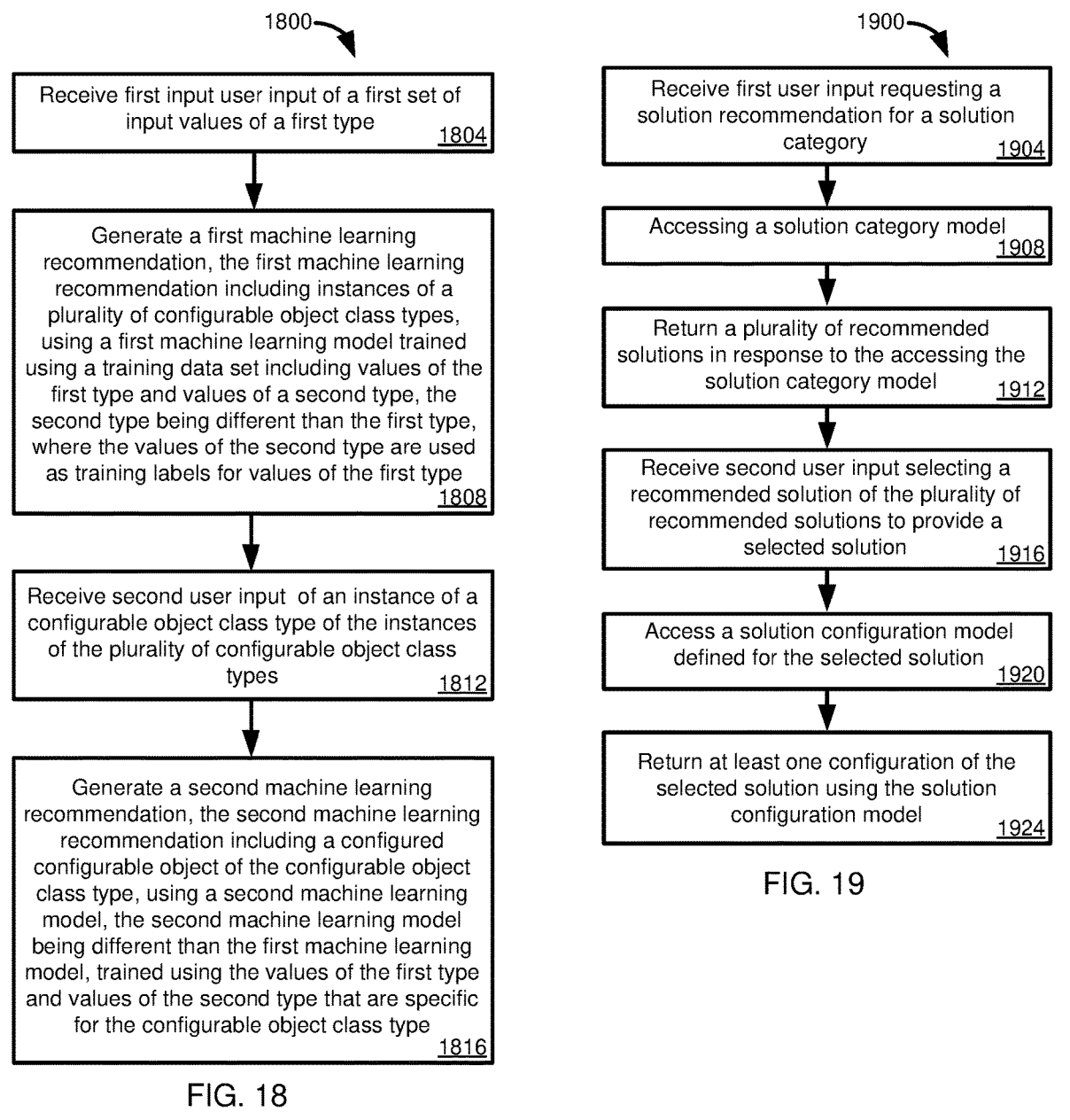

Receive first input user input of a first set of input values of a first type     1804

Generate a first machine learning recommendation, the first machine learning recommendation including instances of a plurality of configurable object class types, using a first machine learning model trained using a training data set including values of the first type and values of a second type, the second type being different than the first type, where the values of the second type are used as training labels for values of the first type     1808

Receive second user input of an instance of a configurable object class type of the instances of the plurality of configurable object class types     1812

Generate a second machine learning recommendation, the second machine learning recommendation including a configured configurable object of the configurable object class type, using a second machine learning model, the second machine learning model being different than the first machine learning model, trained using the values of the first type and values of the second type that are specific for the configurable object class type     1816

Receive first user input requesting a solution recommendation for a solution category     1904

Accessing a solution category model     1908

Return a plurality of recommended solutions in response to the accessing the solution category model     1912

Receive second user input selecting a recommended solution of the plurality of recommended solutions to provide a selected solution     1916

Access a solution configuration model defined for the selected solution     1920

Return at least one configuration of the selected solution using the solution configuration model     1924

FIG. 19

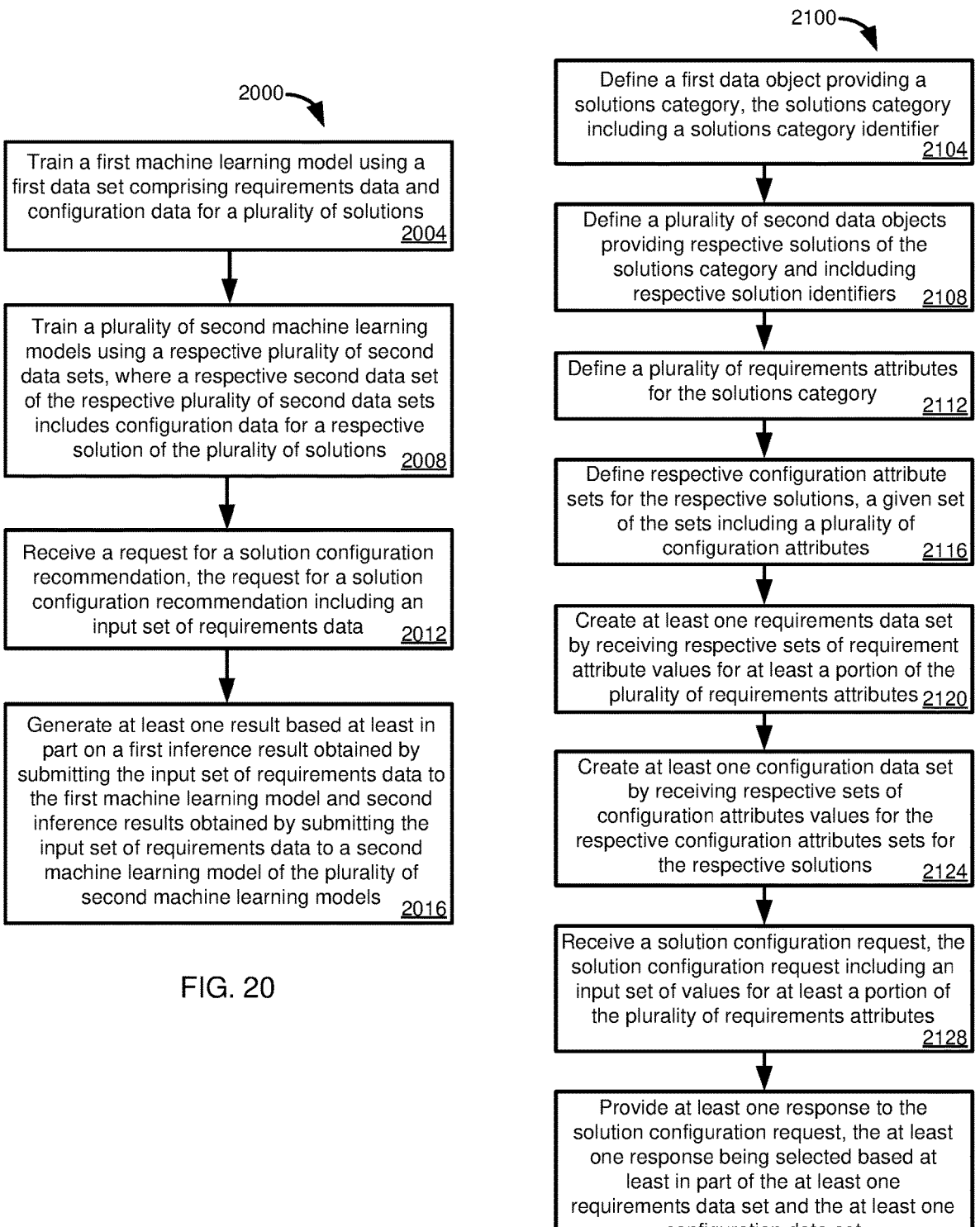

2000⟍

Train a first machine learning model using a first data set comprising requirements data and configuration data for a plurality of solutions
2004

Train a plurality of second machine learning models using a respective plurality of second data sets, where a respective second data set of the respective plurality of second data sets includes configuration data for a respective solution of the plurality of solutions    2008

Receive a request for a solution configuration recommendation, the request for a solution configuration recommendation including an input set of requirements data    2012

Generate at least one result based at least in part on a first inference result obtained by submitting the input set of requirements data to the first machine learning model and second inference results obtained by submitting the input set of requirements data to a second machine learning model of the plurality of second machine learning models    2016

Define a first data object providing a solutions category, the solutions category including a solutions category identifier
2104

Define a plurality of second data objects providing respective solutions of the solutions category and inclduding respective solution identifiers    2108

Define a plurality of requirements attributes for the solutions category    2112

Define respective configuration attribute sets for the respective solutions, a given set of the sets including a plurality of configuration attributes    2116

Create at least one requirements data set by receiving respective sets of requirement attribute values for at least a portion of the plurality of requirements attributes 2120

Create at least one configuration data set by receiving respective sets of configuration attributes values for the respective configuration attributes sets for the respective solutions    2124

Receive a solution configuration request, the solution configuration request including an input set of values for at least a portion of the plurality of requirements attributes
2128

Provide at least one response to the solution configuration request, the at least one response being selected based at least in part of the at least one requirements data set and the at least one configuration data set    2132

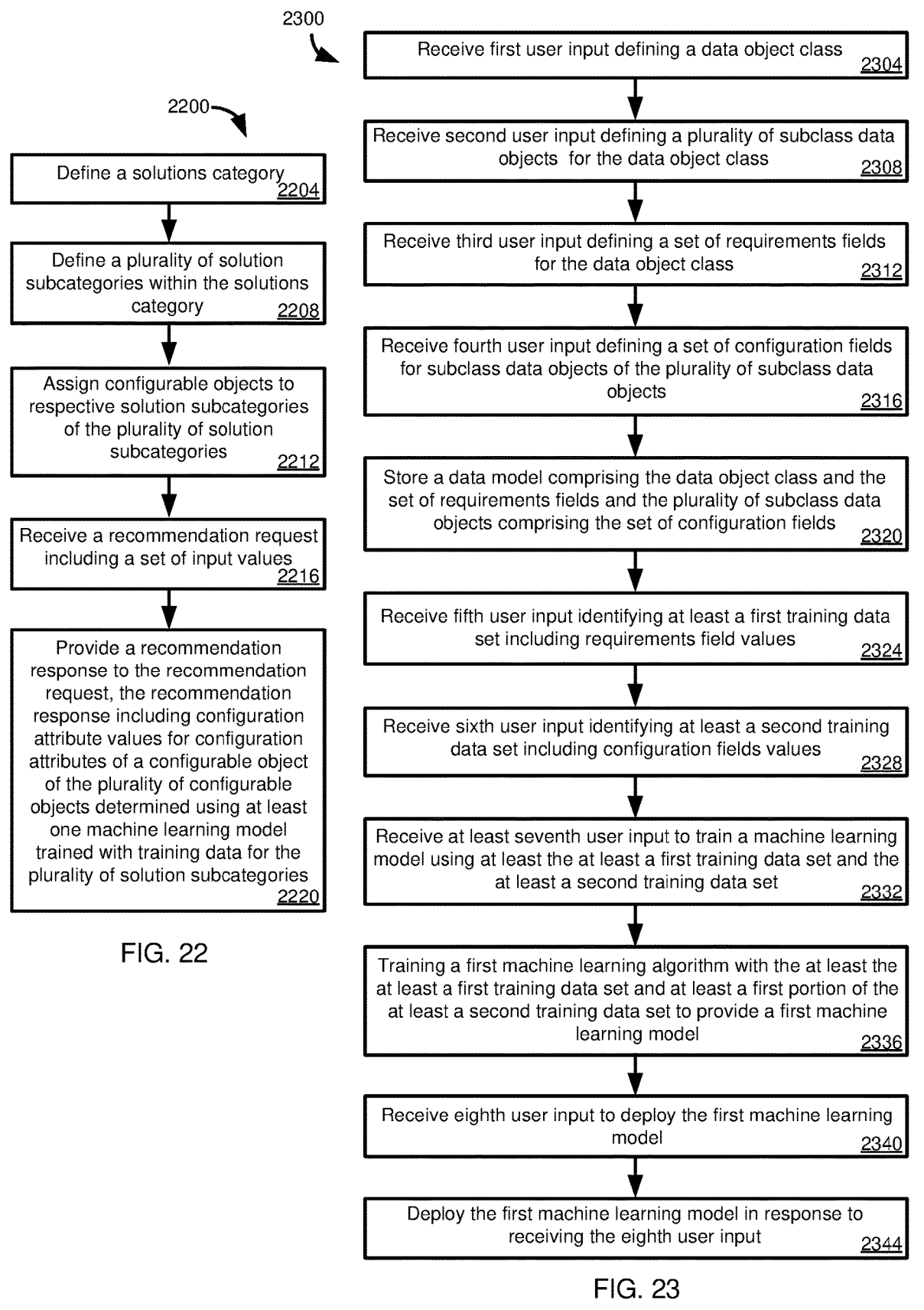

Define a solutions category
2204

Define a plurality of solution subcategories within the solutions category
2208

Assign configurable objects to respective solution subcategories of the plurality of solution subcategories
2212

Receive a recommendation request including a set of input values
2216

Provide a recommendation response to the recommendation request, the recommendation response including configuration attribute values for configuration attributes of a configurable object of the plurality of configurable objects determined using at least one machine learning model trained with training data for the plurality of solution subcategories
2220

FIG. 22

Receive first user input defining a data object class
2304

Receive second user input defining a plurality of subclass data objects for the data object class
2308

Receive third user input defining a set of requirements fields for the data object class
2312

Receive fourth user input defining a set of configuration fields for subclass data objects of the plurality of subclass data objects
2316

Store a data model comprising the data object class and the set of requirements fields and the plurality of subclass data objects comprising the set of configuration fields
2320

Receive fifth user input identifying at least a first training data set including requirements field values
2324

Receive sixth user input identifying at least a second training data set including configuration fields values
2328

Receive at least seventh user input to train a machine learning model using at least the at least a first training data set and the at least a second training data set
2332

Training a first machine learning algorithm with the at least the at least a first training data set and at least a first portion of the at least a second training data set to provide a first machine learning model
2336

Receive eighth user input to deploy the first machine learning model
2340

Deploy the first machine learning model in response to receiving the eighth user input
2344

REQUIREMENTS DRIVEN MACHINE LEARNING MODELS FOR TECHNICAL CONFIGURATION

FIELD

The present disclosure generally relates to machine learning models that can produce technical configurations based on input requirements data.

BACKGROUND

In many areas, there are knowledge gaps between people having different functional roles, or in data maintained in particular computing systems for particular purposes. As an example, a domain expert may understand what data is needed for a particular process. However, the domain expert may lack technical expertise to implement storage regimes for the data, or to implement processes that use the data. That is, the domain expert may lack the knowledge to produce a data model of the needed data. Or, even if the domain expert is capable of producing a semantic data model, they may lack the technical expertise to implement the semantic data model at the level implemented by a computer, such as a physical data model used by a relational database system, or even in a virtual data model that in turn may reference data objects in the physical data model.

As another example, consider situations where users are aware of their needs, but may not have the knowledge to readily determine how to satisfy those needs. Consider an entity that requires a particular type of component, such as an industrial truck to be used in a manufacturing or logistics facility. There may be many types of industrial trucks that could be used for the entity's purposes, but the entity may not know what type, or class, of industrial truck might be most suitable for their needs. Even for a particular type of industrial truck, there may be many models of the type that could be used by a customer, or a single model may have a variety of configuration options. Again, a user may just know what their needs are, but may not be familiar with the technical details of particular industrial truck models to know what specific technical configurations would be needed to make that model suitable for their purposes.

As another example, consider that a pump is needed for a particular engineering scenario. There may be many types of pumps available, such as rotary lobe pumps or progressive cavity pumps, where a number of models of each pump type may be available, each with different configuration options.

Typically, the above problems are addressed by having an entity in need of a product work with a company who sells particular product types, or with an agent or consultant who has expert knowledge in both what product configurations are available and how those configurations may match up with expressed needs. However, coordination between those needing a product and those supplying/recommending suitable products, including those having particular configurable options, can be difficult and time consuming. Further, for complex products, it may be difficult for a single person to have a wide range of product knowledge. Thus, it may be necessary to have many users, each trained to help recommend solutions in different product categories. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for obtaining a suggested configuration for a configurable object. Typically, a particular object and object configuration are recommended based on technical characteristics of the object. However, a user or process wishing to obtain a recommendation may be more familiar with their operational requirements. Disclosed techniques can include an overall solutions category containing solutions of different solutions category subtypes. Sets of requirements attributes and configuration (technical) attributes can be defined for the solutions category. In some cases, a first machine learning model is trained using input values for the requirements attributes and the configuration attributes, and is used to recommend a particular solution in response to a set of input requirement attribute values. Different machine learning models can be trained for the various solutions, including using the configuration attributes for a particular solution, and can be used to recommend a configuration of a selected/recommended solution.

In one aspect, the present disclosure provides a process of obtaining a recommendation of a configuration for a configurable object of a recommended configurable object class type. First user input is received of a first set of input values of a first type. A first machine learning recommendation is generated, the first machine learning recommendation including instances of a plurality of configurable object class types, using a first machine learning model trained using a training data set comprising values of the first type and values of a second type, the second type being different than the first type, where the values of the second type are used as training labels for values of the first type.

Second user input is received of an instance of a configurable object class type of the instances of the plurality of configurable object class types. A second machine learning recommendation is generated, the second machine learning recommendation including a configured configurable object of the configurable object class type, using a second machine learning model, the second machine learning model being different than the first machine learning model, trained using the values of the first type and values of the second type that are specific for the configurable object class type.

In another aspect, the present disclosure provides a process of obtaining a recommended solution using a solution category model and a solution configuration model. First user input is received requesting a solution recommendation for a solution category. A solution category model is accessed. A plurality of recommended solutions are returned in response to the accessing the solution category model. Second user input is received selecting a recommended solution of the plurality of recommended solutions to provide a selected solution. A solution configuration model defined for the selected solution is accessed. At least one configuration of the selected solution using the solution configuration model is returned.

In a further aspect, the present disclosure provides a process of training machine learning models with requirements data and configuration data and providing a response to a recommendation request using such models. A first machine learning model is trained using a first data set including requirements data and configuration data for a plurality of solutions. A plurality of second machine learning models are trained using a respective plurality of second data sets, where a respective second data set of the respective plurality of second data sets includes configuration data for a respective solution of the plurality of solutions.

A request for a solution configuration recommendation is received, the request for a solution configuration recommendation including an input set of requirements data. At least one result is generated based at least in part on a first inference result obtained by submitting the input set of requirements data to the first machine learning model and second inference results obtained by submitting the input set of requirements data to a second machine learning model of the plurality of second machine learning models.

In a yet further aspect, the present disclosure provides a process of obtaining a response to a solution configuration request using a set of requirements attributes and a set of configuration attributes. A first data object is defined providing a solutions category, the solutions category including a solutions category identifier. A plurality of second data objects providing respective solutions of the solutions category and including respective solution identifiers are defined. A plurality of requirements attributes are defined for the solutions category. Respective configuration attribute sets for the respective solutions are defined, where a given configuration attribute set of the respective configuration attribute sets includes a plurality of configuration attributes. At least one requirements data set is created by receiving respective sets of requirement attribute values for at least a portion of plurality of requirements attributes. At least one configuration data set is created by receiving respective sets of configuration attributes values for the respective configuration attributes sets for the respective solutions.

A solution configuration request is received, the solution configuration request including an input set of values for at least a portion of the plurality of requirements attributes. At least one response to the solution configuration request is provided, the at least one response being selected based at least in part of the at least one requirements data set and the at least one configuration data set.

In another aspect, the present disclosure provides a process of obtaining recommended configuration values for a configurable object associated with a particular solution subcategory of a solutions category using a machine learning model trained with training data for a plurality of solution subcategories. A solutions category is defined. A plurality of solution subcategories within the solutions category are defined. A plurality of configurable objects are assigned to respective solution subcategories of the plurality of solution subcategories.

A recommendation request is received that includes a set of input values. A recommendation response to the recommendation request is provided, the recommendation response including configuration attribute values for configuration attributes of a configurable object of the plurality of configurable objects determined using at least one machine learning model trained with training data for the plurality of solution subcategories.

In another aspect, the present disclosure provides a process of defining a machine learning model that can be used in a recommendation process. First user input is received defining a data object class. Second user input is received defining a plurality of subclass data objects for the data object class. Third user input defining a set of requirements fields for the data object class is received. Fourth user input defining a set of configuration fields for subclass data objects of the plurality of subclass data objects is received. A data model including the data object class and the set of requirements fields and the plurality of subclass data objects including the set of configuration fields is stored.

Fifth user input identifying at least a first training data set including requirements field values is received. Sixth user input is received identifying at least a second training data set including configuration fields values. At least seventh user input to train a machine learning model using at least the at least a first training data set and the at least a second training data set is received. A first machine learning algorithm is trained with the at least the at least a first training data set and at least a first portion of the at least a second training data set to provide a first machine learning model. Eighth user input to deploy the first machine learning model is received. The first machine learning model is deployed in response to receiving the eighth user input.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 5-7 illustrate example user interface screens of a guided recommendation process.

FIGS. 8-13 illustrate example user interface screens of a process for defining machine learning models for use in a guided recommendation process.

FIG. 18 is a flowchart of a process of obtaining a recommendation of a configuration for a configurable object of a recommended configurable object class type.

FIG. 19 is a flowchart of a process of obtaining a recommended solution using a solution category model and a solution configuration model.

FIG. 20 is a flowchart of a process of training machine learning models with requirements data and configuration data and providing a response to a recommendation request using such models.

FIG. 21 is a flowchart of a process of obtaining a response to a solution configuration request using a set of requirements attributes and a set of configuration attributes.

FIG. 22 is a flowchart of a process of obtaining recommended configuration values for a configurable object associated with a particular solution subcategory of a solutions category using a machine learning model trained with training data for a plurality of solution subcategories.

FIG. 23 is a flowchart of a process of defining a machine learning model that can be used in a recommendation process.

DETAILED DESCRIPTION

Example 1—Overview

Figure 1:
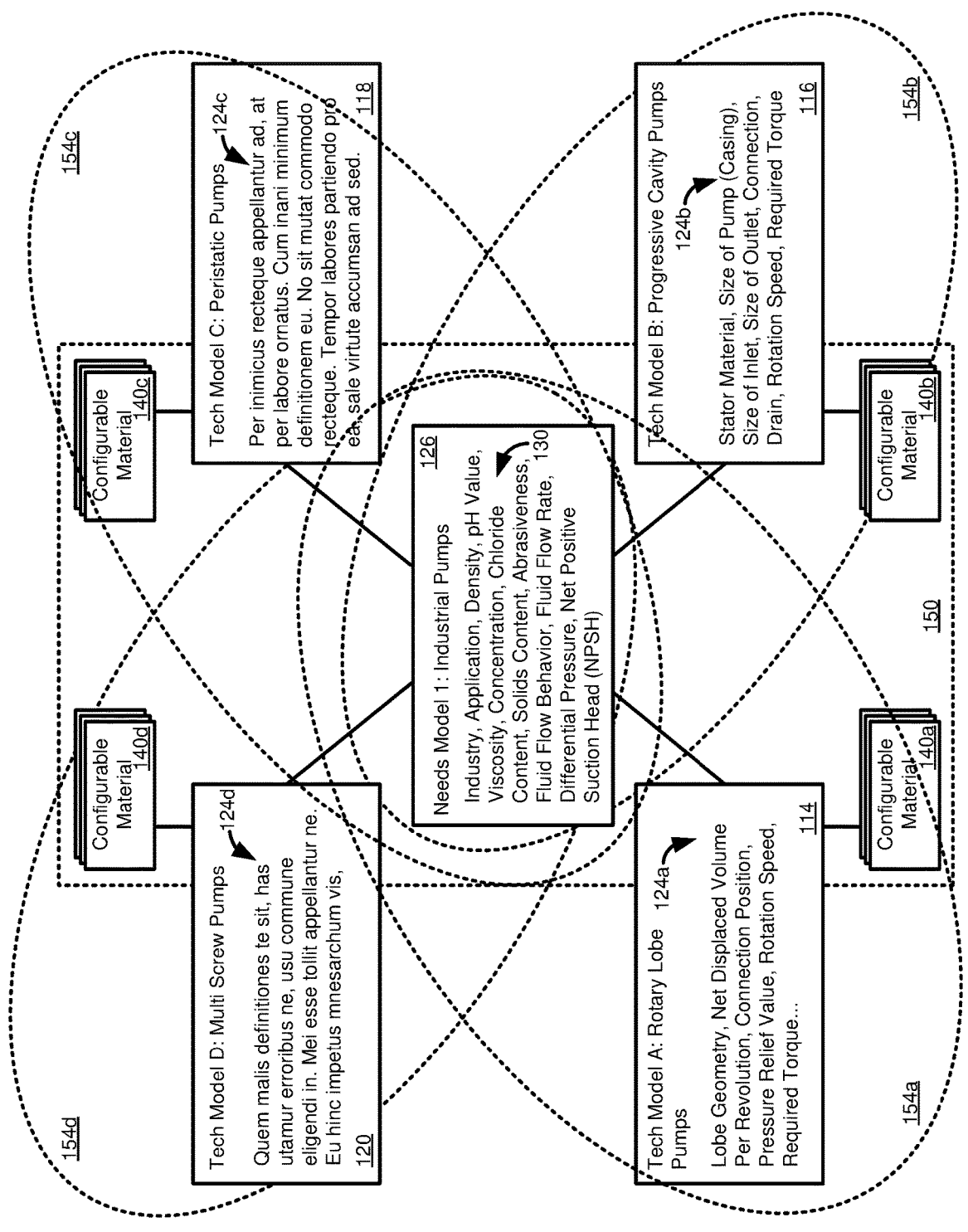
FIG. 1 is a diagram illustrating how machine learning models for providing a solution recommendation and a configuration recommendation can be defined with respect to requirements attributes and configuration attributes.

In many areas, there are knowledge gaps between people having different functional roles, or in data maintained in particular computing systems for particular purposes. As an example, a domain expert may understand what data is needed for a particular process. However, the domain expert may lack technical expertise to implement storage regimes for the data, or to implement processes that use the data. That is, the domain expert may lack the knowledge to produce a data model of the needed data. Or, even if the domain expert is capable of producing a semantic data model, they may lack the technical expertise to implement the semantic data model at the level implemented by a computer, such as a physical data model used by a relational database system, or even in a virtual data model that in turn may reference data objects in the physical data model.

As another example, consider situations where users are aware of their needs, but may not have the knowledge to readily determine how to satisfy those needs. Consider an entity that requires a particular type of component, such as an industrial truck to be used in a manufacturing or logistics facility. There may be many types of industrial trucks that could be used for the entity's purposes, but the entity may not know what type, or class, of industrial truck might be most suitable for their needs. Even for a particular type of industrial truck, there may be many models of the type that could be used by a customer, or a single model may have a variety of configuration options. Again, a user may just know what their needs are, but may not be familiar with the technical details of particular industrial truck models to know what specific technical configurations would be needed to make that model suitable for their purposes.

As another example, consider that a pump is needed for a particular engineering scenario. There may be many types of pumps available, such as rotary lobe pumps or progressive cavity pumps, where a number of models of each pump type may be available, each with different configuration options.

Typically, the above problems are addressed by having an entity in need of a product work with a company who sells particular product types, or with an agent or consultant who has expert knowledge in both what product configurations are available and how those configurations may match up with expressed needs. However, coordination between those needing a product and those supplying/recommending suitable products, including those having particular configurable options, can be difficult and time consuming. Further, for complex products, it may be difficult for a single person to have a wide range of product knowledge. Thus, it may be necessary to have many users, each trained to help recommend solutions in different product categories. Accordingly, room for improvement exists.

In one aspect, the present disclosure provides for a guided product recommendation process. The process can be used directly by a user looking to acquire a product, or an individual who is assisting the user in acquiring a product can use the process on behalf of the user. The guided recommendation process collects information about a user's needs, and then identifies one or more products that may be suitable for the user.

In the process, a first step may be to identify a particular solution or solution category that may be suitable for the user's needs. A second step may be performed in response to a user selecting a particular solution, where the second step involves selecting a particular configuration of the selected solution.

As used herein, a "solution" refers to a particular subclass of recommendable objects from a solution category, where at least a portion of the recommendable objects may be configurable, or a particular solution that is available in multiple configurations. As an example, "industrial pumps" can be a general product/solution category, and solutions can include pumps in a rotary lobe category/subclass or a progressive cavity pumps category/subclass. Each of these two subclasses can include different models of pumps of the respective subclass. A "configuration" in some cases can be a particular model of pump within a subclass. In other cases, a "configuration" can represent a selection of options for a particular solution. Continuing the above example, a final recommendation that may be generated using disclosed techniques can be an industrial pump, of the rotary lobe subclass, of a specific model, and with specific configurable characteristics, such as inlet/outlet sizes.

The steps of the process can be implemented using machine learning models. In particular, a machine learning model can be created that receives user needs information as input and provides a solution recommendation as an output. Other machine learning models can be generated for use in configuring a selected solution, including based on the user needs information. For example, as will be further described, one machine learning model may be used to recommend a solution, and solutions associated with a particular product category can have their own respective machine learning models for use in determining a configuration for a selected solution.

As will be discussed, the machine learning models can be used with training data that includes needs information as the input and uses configuration information associated with various solutions as "labels" to train the respective machine learning model. Links can be established between solution selection and configuration information and information about particular needs that led to selection of a solution/configuration in a set of training data. For example, often sales representatives for a company will take notes as part of product sales activity, where the notes include information about particular customer needs/requirements. These sales records are typically linked to a sales order, quotation, invoice, or similar document that identifies a solution/solution configuration selected by the user.

Another aspect of the present disclosure relates to various data models and attendant data structures or objects that can be used to implement solution/configuration recommendation techniques. In one development scenario, a user can first define a general product category, then define particular solutions within the product category, and then define particular configurable products for the various solutions in the product category. For the product category, the user defines a set of operational needs that a user/buyer may express, and then configuration attributes for the solutions/configurable products that can be used to link solutions/configurations with the operational needs. In some cases, different sets of attributes representing operational needs can be used with a given profile that links operational needs attributes with configuration attributes for a product category. In other words, a given product category can be associated with different sets of operational needs attributes and/or configuration attributes. User interfaces for purchasing a product, such as for collecting values for specified operational attributes, can be dynamically generated at runtime based on a particular set of machine learning models that have been activated for a particular use scenario. That is, the operational needs attributes can be read from a profile and then displayed in a user interface.

For example, a developer of a particular recommendation scenario, or profile, can define needs attributes, product/solution hierarchies, and configuration information for solutions in the hierarchy. That is, for example, in the case of a solution recommendation method for a pump product category, a user may identify rotary lobe pumps and progressive cavity pumps as two possible solutions for a general "industrial pump" product category. The user can then identify particular customer needs that may be relevant to pump selection and particular technical pump attributes that may be relevant to which of these solutions may be most appropriate for a customer, and which configuration of the solution may be most relevant.

In some cases, a user can manually perform one or more of these steps, while in other cases they may be performed automatically, or a user can use automatically generated data to guide user implementation of the steps. Clustering techniques, for example, can be used to identify product categories as well as relevant solutions within a given category. Data mining techniques can be used to identify keywords present in sales order notes, which can help in defining what type of needs information may be relevant for a particular machine learning model. A given product/solution can have many attributes, and data analysis techniques, such as association rule mining or feature analysis, can be used to identify attributes that are particularly relevant to a solution selection or configuration.

In another aspect, the present disclosure provides techniques that facilitate the development and use of machine learning models, including "low code" or "no code" techniques. That is, for example, a variety of machine learning algorithms can be made available for user selection, where a user can simply identify particular data sets to be used for model training and appropriate data model definitions, such data model definitions of product/solution categories/hierarchies, definitions of needs attributes, and definitions of product/solution configuration attributes. In some cases, a particular use scenario can be selectively associated with particular machine learning models. That is, as different machine learning models are developed, particular use scenarios (such as for a set of input values for operational needs attributes or a selection of a particular solution) can be switched to use such different machine learning models.

The remainder of the present disclosure generally focuses on a particular use case of guided product recommendations, as it provides an easy-to-understand example of how disclosed techniques can be implemented and used. However, the techniques can be used in other scenarios.

For example, the techniques can be used in determining how to configure a computing system, or software running thereon, such as a relational database system. A user may know various performance requirements for the database, such as a number of tables or views, an approximate number of records to be stored, a number of concurrent queries to support, or a desired execution time. However, the user may not understand how to select suitable database software, or particular computing hardware, to satisfy those requirements. In a similar manner as described above, needs information for this scenario can be linked to technical characteristics, such as a number of processors or an amount of memory needed, a number of threads to be implemented, or particular data partitioning arrangements (which can for example, affect the speed at which JOIN operations can be executed, or how data processing tasks might be distributed to different database nodes of a database system).

Disclosed techniques can be advantageous, as they can provide a general framework that can provide product recommendations for products with a diverse set of characteristics, and which are useable to fulfill a diverse set of operational needs. As opposed to certain recommendation techniques that recommend products based on similarity to another product based on technical/configuration attributes, disclosed techniques can be useful when a user instead understands their operational needs, but may not understand what product, or product configuration may best suit those needs.

Disclosed techniques can be advantageous, as they can employ machine learning models that are customized to a particular set of products, having similar characteristics and operational needs, can provide more accurate results than a more general model that includes products with different characteristics and which satisfy different operational needs. Similarly, an approach where a product type/class ("solution," as used herein) is identified first, and then a configuration model for that solution used, can provide more accurate/"better" recommendations than if a single model were used.

Example 2—Example Machine Learning Models for Solution Recommendation and Configuration Recommendation FIG. 1 is a diagram that illustrates relationships between needs (or requirements) information and configuration information for particular solutions that may satisfy those needs. Although not limited to such an implementation, and which implementation will be further described, needs information and configuration information can be implemented as attributes in one or more database tables.

FIG. 1 represents a product/solution model (or "structure") for a "pump" solution category, where the pump solution category has four solution types: rotary lobe pumps 114, progressive cavity pumps 116, peristatic pumps 118, and multi screw pumps 120. Each of the solution types 114-120 is associated with a set of configuration attributes 124 (shown as 124a-124d). Some of the configuration attributes 124 may be common between solution types. Common configuration attributes for different solution types can be considered together when determining a particular solution type for a particular sets of needs attributes 130 of a needs model 126 for the pump product category. However, once a particular solution is selected, only its configuration attributes are used in recommending a solution configuration, even if some attributes have the same or a similar semantic meaning in another solution type.

Particular solution configurations are shown as configurable materials 140 (shown as 140a-140d). A configurable material can represent a particular solution of a particular solution type, such as a particular pump model that is available for purchase, and which can have one or more configurable attributes. In the case of a pump, these attributes can include, for example, an inlet size, and outlet size, an inlet orientation, or an outlet orientation. While configurable materials 140 can be implemented in a variety of ways, in a particular implementation they can be implemented using the KMAT data objects (variant configurator of advanced variant configuration capabilities) available in technologies from SAP SE, of Walldorf, Germany.

FIG. 1 illustrates how the various attribute collections can be used to define machine learning models. A machine learning model 150 can be used to select a particular solution based on particular needs information, and includes the information in each of the configurable materials 140, as well as the attributes 130 of the needs model 126 for the pump category. Machine learning models 154a-154d can be trained using the attributes 130 of the needs model 126 and the respective configuration attributes 130a-130d and configurable material information 140a-140d of a given solution type 114-120.

Example 3—Example Attribute Values Sources for Producing Trained Machine Learning Models Aspects of the present disclosure involve training various machine learning models using information about customer needs and solution configuration information. For a machine learning model that recommends a solution, the needs information can serve as training input data and the configuration information associated with a given set of needs information (such as associated with a particular historical sales event) can serve as labels for training a machine learning model, such as a classification model.

Suitable classification models can include neural networks, including deep neural networks. In training a machine learning model, a result can be calculated using the machine learning model for a particular set of training data. The result can be compared to an "actual" result, in the form of a "label" applied to the training data—the product (or products) that were recommended for the particular set of training data. A measure of loss is calculated, representing the difference between the "correct" value for the training data and the predicted value provided by the machine learning model. This measure of loss is then used to update properties of the machine learning models, such as neuronal weights. Successive training epochs result in the measure of loss being progressively reduced, represented improved model accuracy. Once trained, the machine learning models can be used to provide a predicted solution for a set of input needs data. Once a solution is selected, another machine learning model can be used to provide a predicated configuration for the solution.

Figure 2:
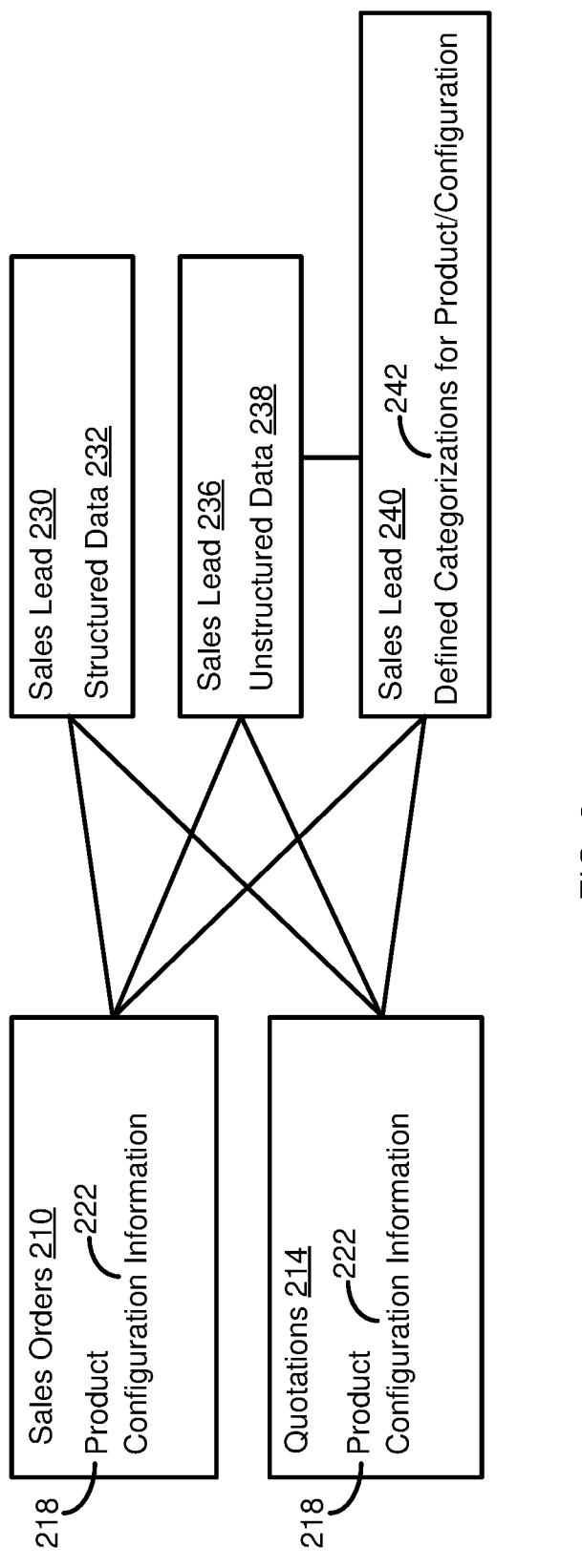
FIG. 2 is a diagram illustrating how documents reflecting requirements attribute values can be associated with documents reflecting associated configuration attribute values, such as for use in training the machine learning models depicted in FIG. 1.

As shown in FIG. 2, information about products that were eventually sold, or at least recommend for purchase (such as being recommended by a knowledgeable expert), can be associated with a variety of document types, including sales orders 210 and quotations 214. Both the sales orders 210 and the quotations 214 can include information such as an identifier 218 of one or more products (which form solutions of the machine learning model) associated with the document, as well as configuration information 222 for such products (again, using the example of a pump, where configuration information could include inlet/outlet sizes and orientations).

A given instance of a document type can include additional information, such as an estimated delivery time, cost, or warranty period. This information can be used, in some implementations, in providing product recommendations. For example, if a customer has particular needs in regard to delivery time, price, warranty, etc., historical information can be used to help recommend products that might help satisfy those needs. However, it should be noted that these features are not technical features/configuration features, and so may be omitted if desired. If non-technical features associated with a document type are desired to be used with technical features, they can be optionally included in a set of attributes used for model training.

For purposes of model training, data in the sales orders 210, quotations 214, or other documents reflecting a recommended or sold/purchased product (solution with a particular configuration) is linked to information containing customer needs that were associated with the product. Needs information can come from a variety of sources, which are generally called "sales leads." A sales lead can be any document that is in electronic form that reflects customer needs, where the needs can be captured in a variety of ways. For example, a sales lead document 230 can include needs information that was captured as structured data 232. The structured data 232 can be in the form of data received through various user interface controls/fields of a graphical user interface through which a sales representative or agent (or the customer themselves) entered information regarding customer needs, such as during a call with a customer or an in-person visit.

The user interface can include user interface elements that can capture needs information. Using the prior example, capturing needs information can include formation such as an inlet/outlet size or orientation desired by a customer. For example, a user interface can have fields labelled with different customer needs attributes, and a sales representative (or in some cases, the customer themselves) can enter appropriate values into the fields. Other attributes can be associated with dropdown menus, range selectors, or other user interface controls that allow for data entry.

Input provided through the user interface can be stored electronically in association with a particular variable that represents a particular needs attribute. Particular implementations store needs attributes and associated values in one or more relational database tables, which can facilitate retrieval of data for use in machine learning training. Structured data 232 for needs attributes can be linked to the product/configuration attributes, such as when a common identifier, for example a sales lead identifier, which is also associated with a sales order 210 or a quotation 214, is also used with the sales leads document 230.

In some cases, all or a portion of customer needs information is not natively provided in a structured format, as shown for a sales lead document 236, containing at least some unstructured data 238. The unstructured data 238 can include free form notes taken by a sales representative during a meeting or call with a customer, which can be more convenient in some cases than using structured data, as it may be faster for the representative, and because the representative may not know at the time of the meeting what specific product/needs information will be relevant to a customer request—that information may only become clear after a conversation with the customer has been completed. Or, it simply may be inconvenient to try and enter information in a structured manner while having a discussion.

Unstructured data 238 is typically entered digitally, although physical notes can be digitized, and text recognition used to convert the physical notes to unstructured, natural language text. Regardless, when a sales representative contacts a customer, an entry is made into a computing system (such as CRM, client relationship management, software), which can be associated with the unstructured text, and in turn can be associated with a document that contains product/configuration information for a recommended/sold product, where that document can be linked to the needs information as described for the sales lead document 230.

In some cases, the unstructured text of the sales lead document 236 can be used directly with product/configuration information, such as the sales order 210 or the quotation 214. For example, the text could be extracted from a document, such as an electronic document or an electronic version of the physical document, representing a request for proposal or a request for quote. Unstructured data can be present in other formats, such as audio in an audio or video file that is extracted into a textual form. However, this approach may be most suitable when inference data for customer needs will also be provided in an unstructured format.

In another aspect, the unstructured data 238 in the sales lead document 236 can be converted to a structured format, such in a sales lead document 240. Converting the unstructured data to structured data can include scanning the unstructured text for elements such as keywords or phrases, units of measure, or numerical values or ranges and then assigning text or numerical elements to structured needs for defined needs/solution configuration attributes based on a correlation between the unstructured data and the attributes. For example, unstructured data may include information about a desired flowrate, where terms such as "flowrate," units such as "cubic feet per second," or values that are typically associated with a flowrate for a particular product class can be used to assign a flowrate value in the unstructured data 238 in the sales lead document 236 to a flowrate variable/attribute in the defined attributes 242 of the sales lead document 240.

Figure 3:
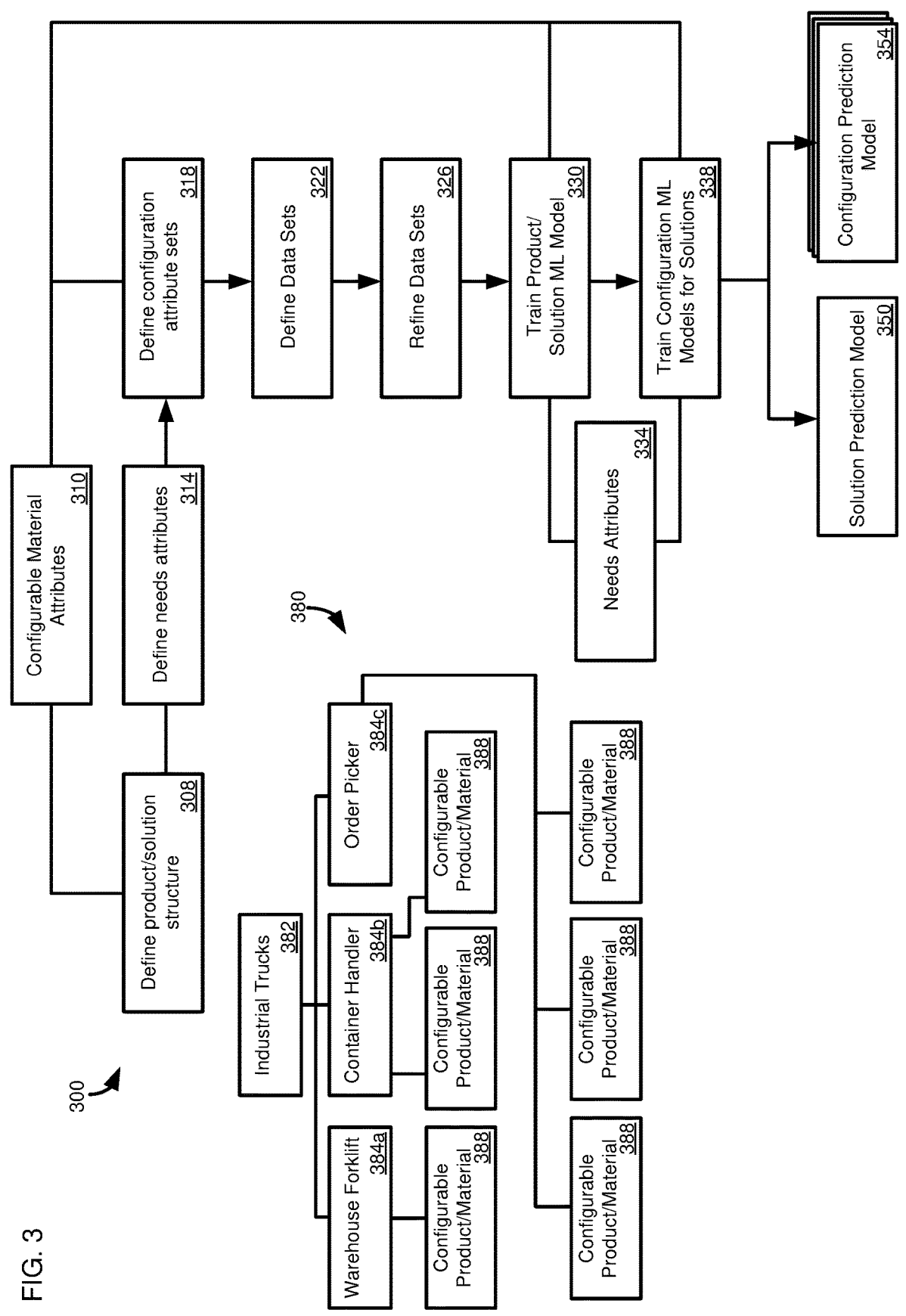
FIG. 3 is a diagram of a flowchart of a process for creating a solution recommendation machine learning model and multiple configuration machine learning models, as well as an associated product/solution hierarchy.

Example 4—Example Process of Producing Trained Machine Learning Models for Solution and Configuration Recommendation FIG. 3 is a flowchart of a process 300 for defining machine learning models for use in guided recommendations. At 308, a product/solution structure is defined. The product/solution structure can be hierarchical, such as shown for the example product/solution structure 380. The product/solution structure 380 can be implemented as a data model, such as a data model that reflects a plurality of data objects, or instances thereof. For example, a data object, such as a relational database table, can store information about solutions in the structure. As further described below, other data objects can store information about particular solutions 384, including particular instances of those solutions associated with a solution, and yet further data objects can store information about particular solutions instances (or types, where various attributes can be defined for a solution type, where instances of the solution type include values for such attributes).

In the product/solution structure 380, a general product (or solution) category (or class) 382 is defined, in this case "Industrial Trucks." A plurality of solutions 384 (shown as 384a-384c) within the product/solution category are defined for the general product category: "Warehouse Forklift," "Container Handler," and "Order Picker," respectively. The solutions 384 can be considered as subclasses of the solution class 382.

Each of the solutions 384a-384c can be associated with one or more configurable materials/products 388. A configurable material/product 388 can represent a particular type of solution 384, as well as configuration options for the particular solution. As an example, the "order picker" 384c is shown as having three configurable materials/products 388. The configurable materials 388 for the "order picker" 384c can represent, for example, different models of order pickers, which can have different operational parameters/capabilities. In addition, an individual order picker configurable material 388 can have different configuration options, such as being available in battery, liquid propane gas, gasoline, or diesel configurations.

Thus, a product/solution category 382 represents solutions, and their associated configurable materials/product, with a general class. The individual solutions 384 can be considered as subclasses of the product/solution category 382, and the configurable materials/products 388 can be considered as instances of a particular solution/subclass.

Returning to the process 300, the product/solution structure defined at 308 can be associated with various configurable material attributes 310. For example, a given configurable product can be associated with a set of attributes that describe its operational parameters/capabilities. These operational parameters/capabilities, including possible values (for example, a datatype, or an enumerated list of values) may be predefined for a given solution subclass instance (where the collection of parameters for subclass instances forms a set of parameters defined for the subclass), such as a particular forklift model, where some parameters, or parameter values, can be the same between different forklift models, where others can be different. Operational parameters can be defined for purposes of selling products, but can also be defined in sources such as a manufacturing specification (as a bill of materials, which can be processed, such as by "flattening," converting data from a hierarchical format to a non-hierarchical format, for use in disclosed techniques).

A set of needs attributes is defined for elements of a product/solution structure at 314. In some cases, needs attributes may already be defined, such as in definitions for products that are used with a CRM system. Defining a set of needs attributes at 314 can include selecting all or a portion of such predefined needs attributes. In other cases, at least a portion of the needs attributes are specifically defined at 314.

Sets of configuration attributes are defined at 318. Defining configuration attribute sets at 318 can include selecting all or a portion of the relevant configurable material attributes 310. As described above, configuration attribute sets can be defined for individual solution subclasses, based on their associated configurable materials, while a set for an overall solution class can be defined as a superset of the sets for the component solution subclasses.

Data sets for use with machine learning models are defined at 322. That is, once needs or configuration attributes are defined, sources of data are identified to provide examples/values of those attributes that can be used for model training. As discussed, data sets typically include both needs attributes and associated configuration attributes, which serve as labels that can be used in model training. Optionally, the data sets can be refined at 326. Refining data sets can include filtering data values or data elements, such as to exclude from training data values that might be erroneous, or which simply are not desired to be used for model training, such as if a training data set includes outdated/superseded attribute values, such as when a particular product configuration is no longer available.

Machine learning training to provide a solution machine learning model is performed at 330, where the training uses the configurable material attributes 310 (more specifically, particular values that are associated with a particular data set defined at 322) and needs attribute data 334. Similarly, machine learning training to provide a solution configuration machine learning model is performed at 338, where the training also uses the configurable material attributes 310 and the needs attributes data 334, according to the datasets defined at 322. The result of the training at 330 and 338 provides a solutions prediction machine learning model 350 and configuration prediction models 354, where in a least some implementation a configuration prediction model is produced for each solution subclass that can be a result of the solutions prediction machine learning model (where a given configuration prediction model is trained using configuration attributes for a solution subclass to which the model corresponds, as well as with the needs attributes data 334).

Figure 4:
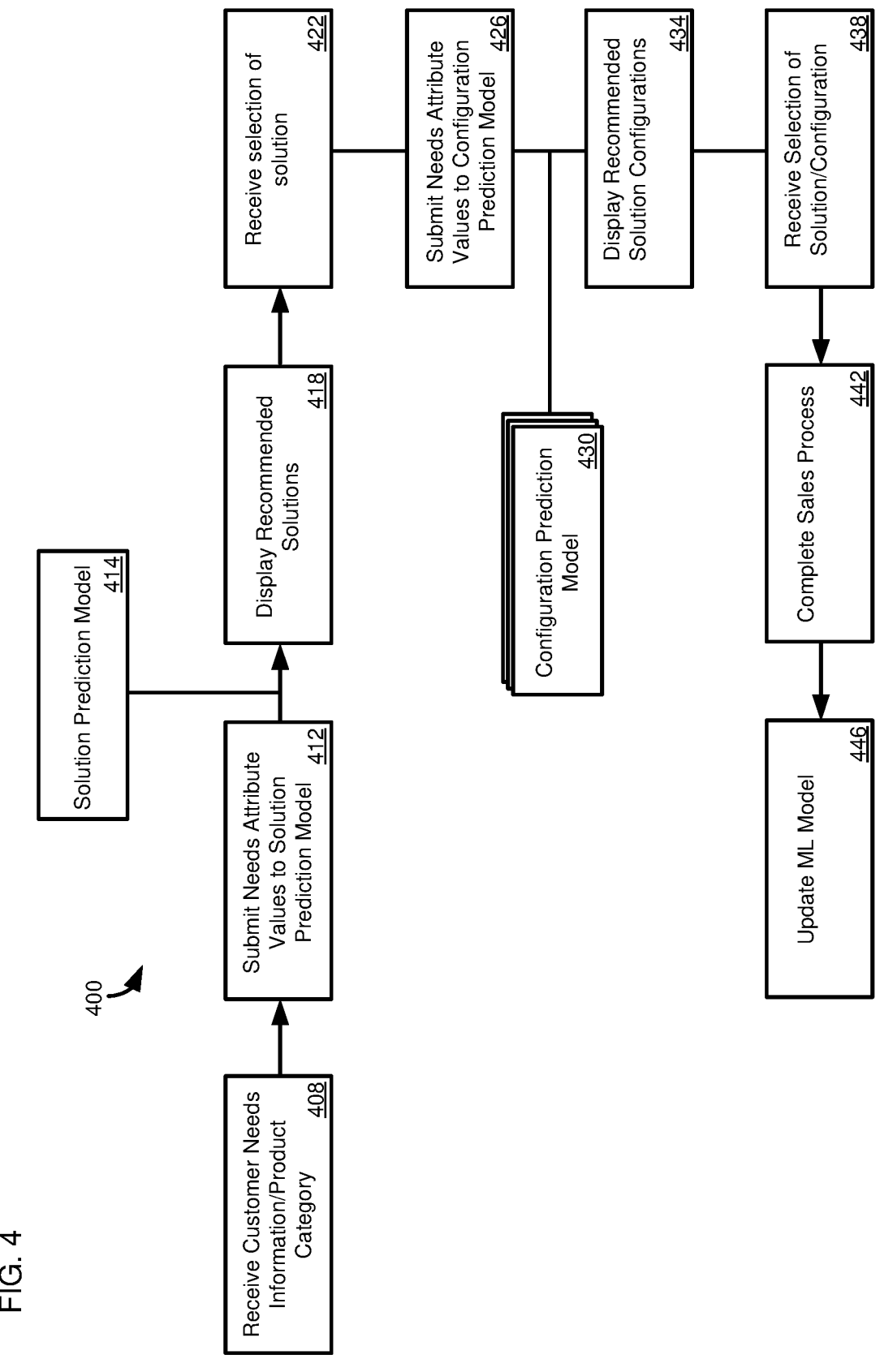
FIG. 4 illustrates a flowchart of a process for obtaining a guided recommendation using a solution recommendation machine learning model and a configuration recommendation machine learning model.

Example 5—Example Use of Trained Machine Learning Models in Guided Recommendation Process FIG. 4 is a flowchart of a process 400 for obtaining a product recommendation based on expressed needs, which can use the machine learning models produced in the process 300 of FIG. 3. That is, a final result of the process 400 can be an instance of a solution having predicted values for configuration attributes.

Customer needs information is received at 408, which can include values for particular needs attributes and an identifier of a product (solution) category. In some cases, an indicator of a product category provided by a customer can be used to provide needs attributes for which a customer can enter values. Alternatively, a sales representative can query a customer regarding the product category/values for needs attributes and provide the information at 408.

In the case of needs attributes, in at least some implementations, values need not be provided for all needs attributes. For example, a customer may not know their needs for certain needs attributes, or the customer may not have particular requirements for particular needs attributes. In some cases, if values are not provided for certain needs attributes, values are simply not provided to a machine learning model. In other cases, default values can be provided, where default values can be defined manually or in a computer-assisted manner, such as using additional machine learning models or using techniques such as association rule mining. In the case where a representative enters values provided by a customer, the representative can select appropriate values for needs attributes for which a customer did not directly provide a value.

The needs attribute values are submitted to a solution prediction model 414 at 412. The solution prediction model 414 provides one or more solution (subclasses of a particular solution/product class) recommendations as inference results, which are displayed at 418. At 422, a selection of one or more solutions is received. The needs attribute data is submitted, at 426, to configuration machine learning models corresponding 430 to the selected one or more solutions provided at 422.

One or more recommended solution configuration predictions are provided as inference results, and are displayed at 434. Optionally, the process 400 can include additional operations. In some cases, the product recommendation process 400 can be tied to an order system, in which case a sales process can be initiated. A selection of a particular solution/configuration is received at 438. A sales process is completed at 442, such as by providing "check out" functionality.

If a particular solution configuration is selected from the results displayed at 426, the needs information and the solution configuration attribute values can be used to update one or more of the machine learning models 414, 430 at 446. In some cases, a machine learning model can be periodically retrained, such as to use more recent training data in an attempt to increase prediction accuracy. For example, purchasing trends may change over time, as may available solution configurations.

Figure 5:
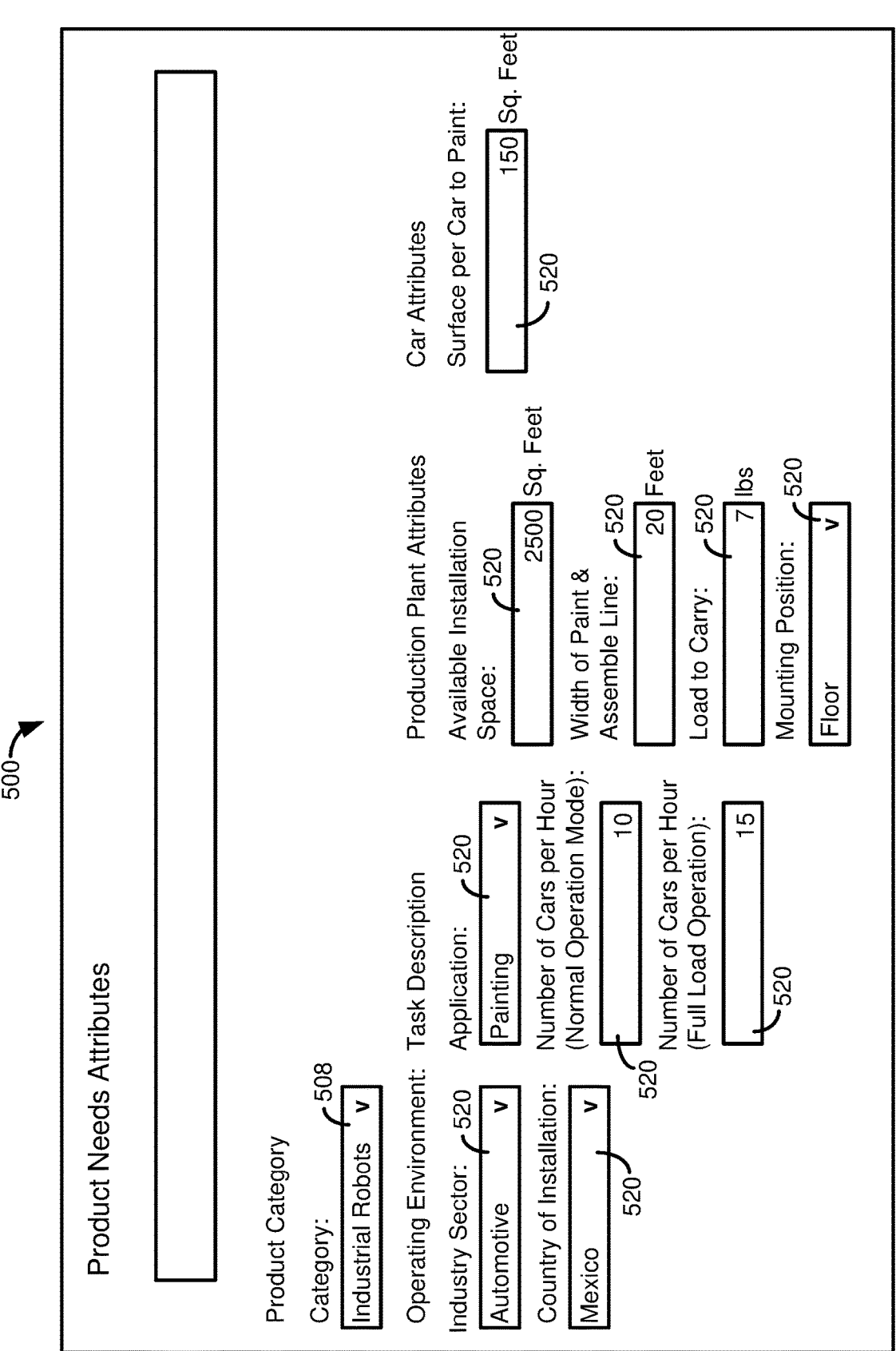
Figure 6:
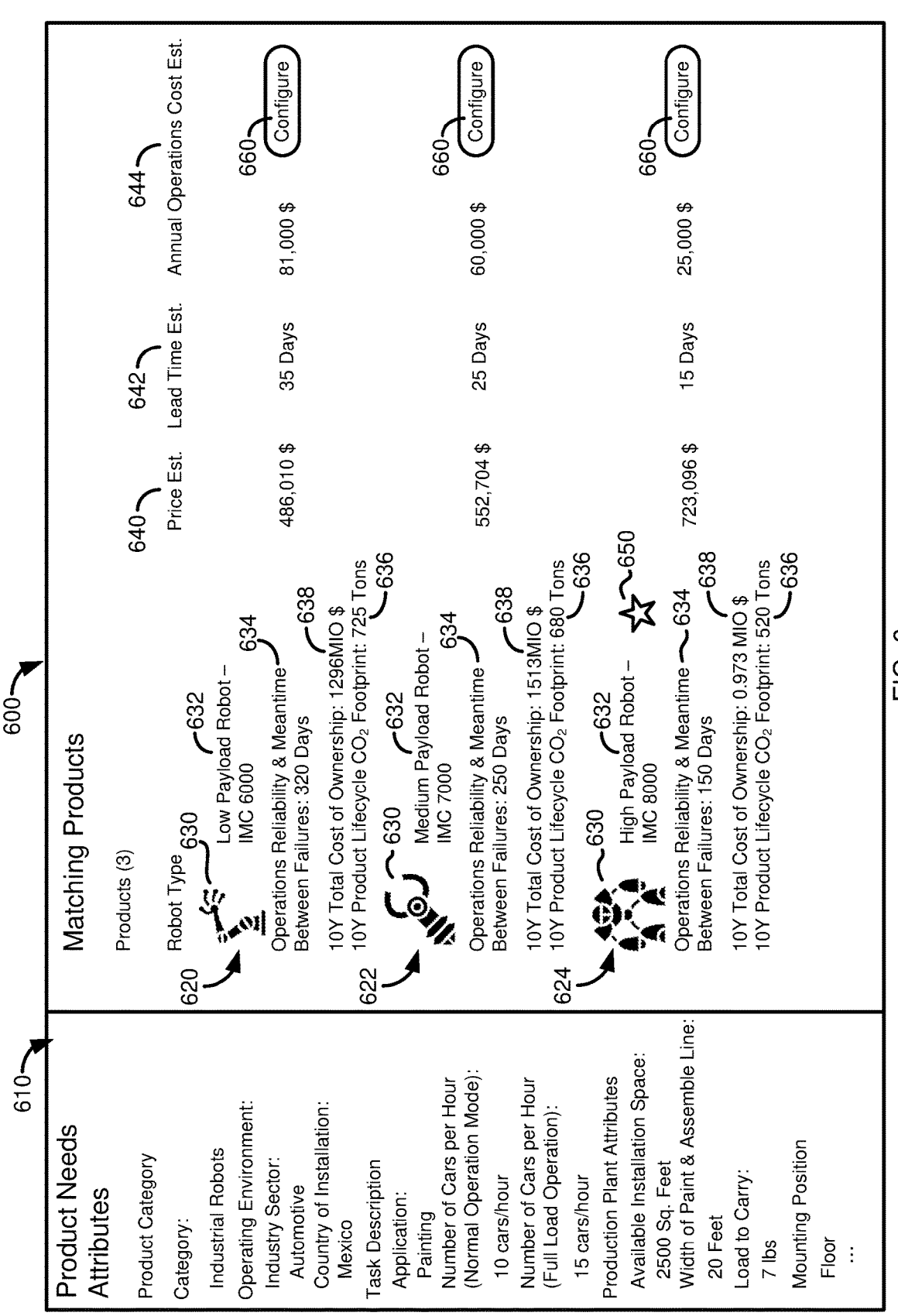

Example 6—Example User Interface Screens for Obtaining Guided Recommendations FIGS. 5 and 6 illustrate user interface screens 500 and 600 that can be presented as part of a product recommendation process, such as the product recommendation process 400 of FIG. 4. In the screen 500, a user can enter a particular product category using a user interface control 508, which is shown as a dropdown menu. As disused, the product category can be associated with particular product recommendation machine learning models. The models can include a model trained to recommend a solution in the product/solution category and a model trained to recommend a particular configuration of a particular solution in the product/solution category. The product category selected can also be used to define the needs attributes for which a user provides values using the user interface screen 500. That is, for example, a product category can be associated with particular needs attributes, which are retrieved (such as from a database table or other database object) and rendered when the product category is selected using the interface control 508.

The user interface screen 500 provides a plurality of entry fields 520 where a user can provide values for various needs attributes, where the fields can be user interface controls that allow for free text entry or are associated with drop down menus or numerical value selectors, including for numerical ranges. Note that in some cases needs attributes can be provided in different formats, such as in different units of measure. The entry fields 520 can be associated with controls that allow a user to specify/change a particular unit of measure. If the unit of measure differs from that used in training data for model creation, in at least some cases, the values entered by a user can be converted to a format used in the machine learning model. In a similar manner, when a training data set is being created, values for a common attribute that are expressed in different formats can optionally be converted to a common format for use in model training.

Values provided for the needs attributes using the entry fields 520 can be stored, such as in a suitable datatype or data object, such as storing the values in a vector or array, or as values for data members for an abstract or composite data type that represents an instance of a collection of needs attributes. Note that the needs attributes for which entry fields 520 are provided typically correspond to needs attributes used in model training, where the training data can also be stored as vectors, instances of abstract or composite data types, or as rows in a relational database table. In an inference request, input needs attribute values are provided in the data structure/data type to a machine learning model to obtain inference results.

The user interface screen 600 of FIG. 6 presents product recommendations based on the needs attributes entered through the user interface screen 500 of FIG. 5. In the user interface screen 600, the values for the needs attributes entered using the user interface screen 500 are summarized in a panel 610.

The user interface screen 600 presents three recommended solutions 620, 622, 624 that were determined from a solutions recommendation machine learning model based on the input needs attribute values. Information about the recommend solutions 620, 622, 624 can be provided to help a user determine which solution is of most interest. As shown, the information provided for the solutions 620, 622, 624 includes an image 630 of the given solution, a solution description (such as a product model/name) 632, reliability information 634, environmental impact information 636, an estimated cost of the solution over the solutions predicted lifecycle 638, an estimated price 640, an estimated lead time before product delivery 642, and an estimated annual operations cost 644. An indication 650 of a particularly recommended product can optionally also be provided.

Note that in some cases, the user interface screen 600 can also include technical characteristics of a solution 620, 622, 624, or additional information about a solution can be provided if a user selects one of the solutions. A user can select a solution 620, 622, 624 for configuration, such as by using a user interface control 660. Upon the selection of a control for a particular solution 620, 622, 624, the needs attributes entered in the user interface screen 500 are provided to a solution configuration machine learning model defined for the solution, and a recommended configuration 710 is provided for the selected solution, as shown in the user interface screen 700, which can be an update to the user interface screen 600.

Example 7—Example User Interface Screens for Creating Guided Recommendation Processes FIGS. 8-12 illustrate activities that can be performed in defining a guided recommendation scenario, which can serve as "backend processes" that provide recommendations (inference results) in a guided recommendation process, including as explained in conjunction with the user interface screens 500, 600, 700 of FIGS. 5-7.

Figure 8:
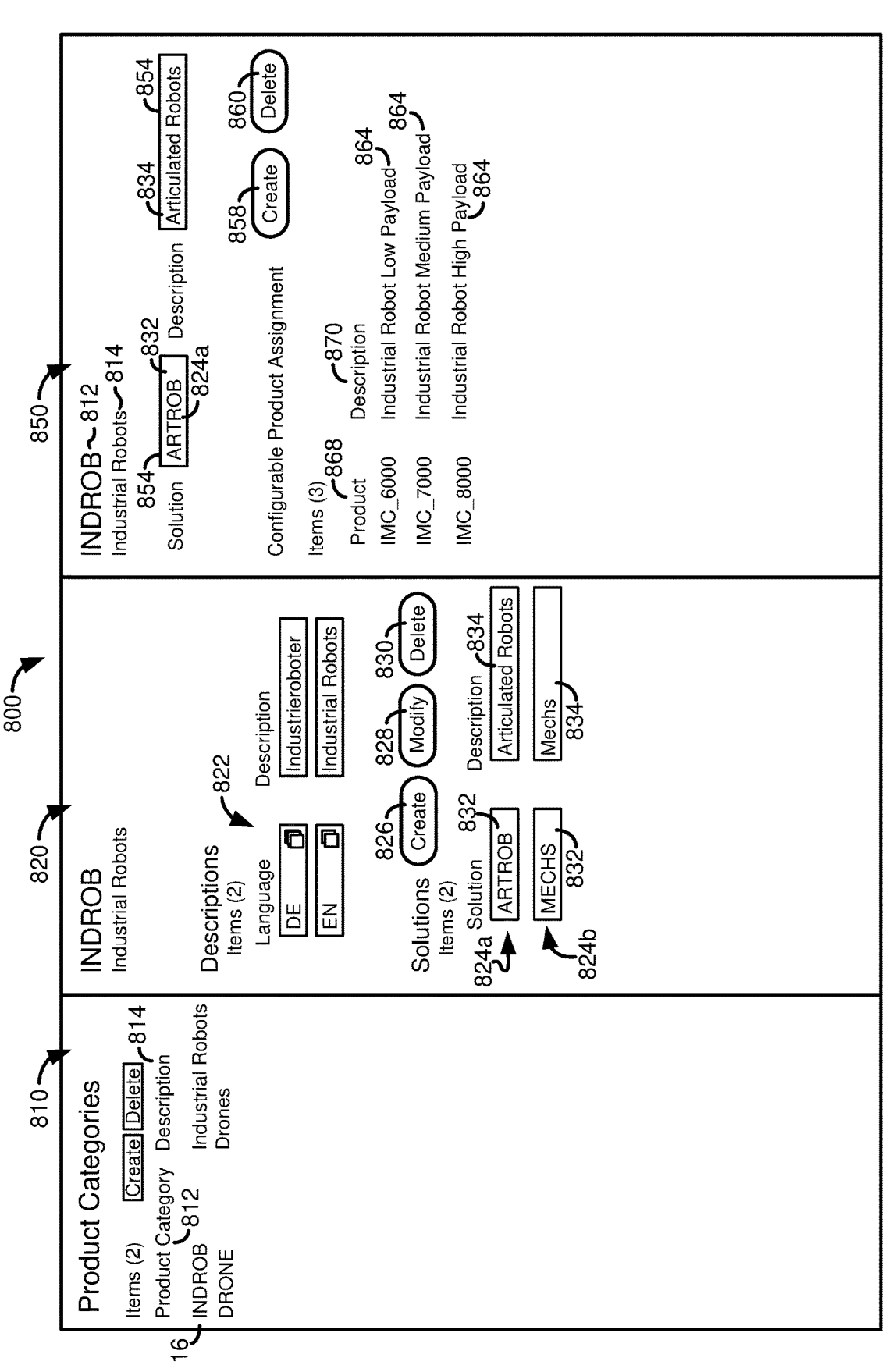

FIG. 8 provides an example user interface screen 800 that facilitates creation of a product/solution structure. In the user interface screen 800, a panel 810 provides category codes 812 and category descriptions 814 for available/created product categories. The remainder of the user interface screen 800 provides information for a specific product category 816 of "Industrial Robots."

A panel 820 of the user interface screen 800 allows a user to enter descriptions 822 of the product category (optionally including in different languages) and to display available solutions 824 (shown as solutions 824a and 824b) defined for the product category. User interface controls 826, 828, 830 allow a user to, respectively, create a new solution, modify properties of a solution, or to delete a solution. For the solutions, the user interface screen 800 can provide an identifier code 832 for the solution and a more semantically meaningful description 834 of a solution. As shown, two solutions 824a and 824b have been defined for the industrial robots category, where details for the solution 824a, "articulated robots," are displayed in a panel 850.

The panel 850 includes the category code 812 and category description 814 values for the industrial robots category, and provides fields 854 where a user can modify the solution identifier code 832 or the semantic description 834 of the selection solution 824a. A user can add or remove configurable products assigned to the selected solution 824a using respective user interface controls 858, 860. Details are shown for configurable products 864 for the selected solution 824a, including a product identifier 868 and a semantic product description 870.

Typically, configurable products are defined, such as in one or more relational database tables or other type of abstract or composite datatype, elsewhere in a software system, where the definition includes the product identifier 868 and the semantic description 870. Typically, the definition contains, or is usable to identify or retrieve, particular attributes associated with a given configurable product (or material). These attributes include at least certain attributes that are both technical and configurable, but attributes can also include non-configurable attributes or non-technical attributes, which can be needs attributes or can be attributes such as a product price, inventory status, or current lead time (where these attributes can in turn be affected by particular values selected for technical configurable attributes).

In the examples shown and described, a simple product/solution structure has been shown with a single product/solution category and two solutions, where the solutions are at a common hierarchical level with respect to the product category. In other cases, solutions can be at different hierarchical levels from one another with respect to the product category. For example, a particular solution may itself have additional solutions that can be considered as "subcategories" of that solution. A given solution can have child solutions, child configurable products, or a combination of child solutions and child configurable products.

Figure 9A:
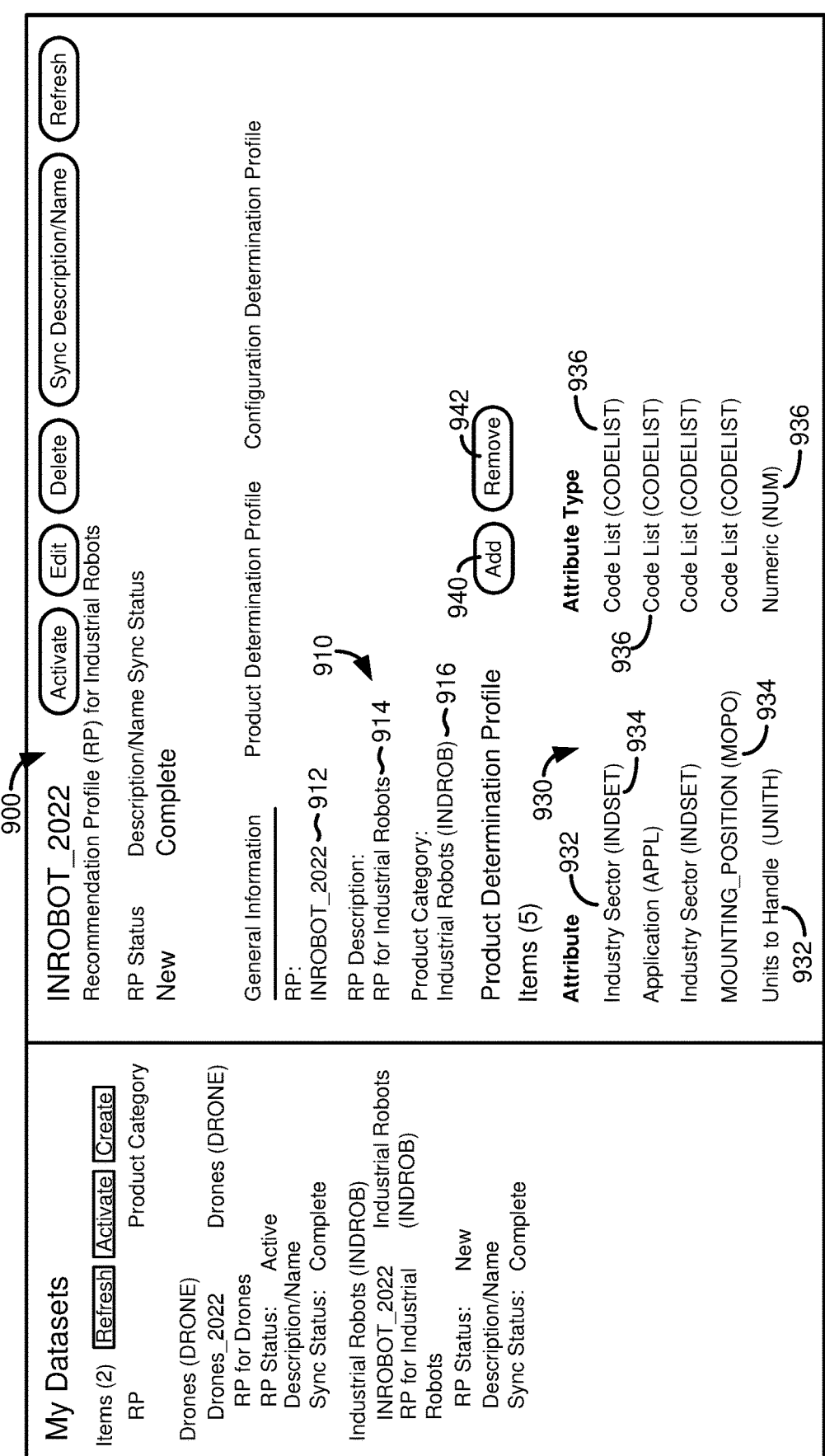
Figure 9B:
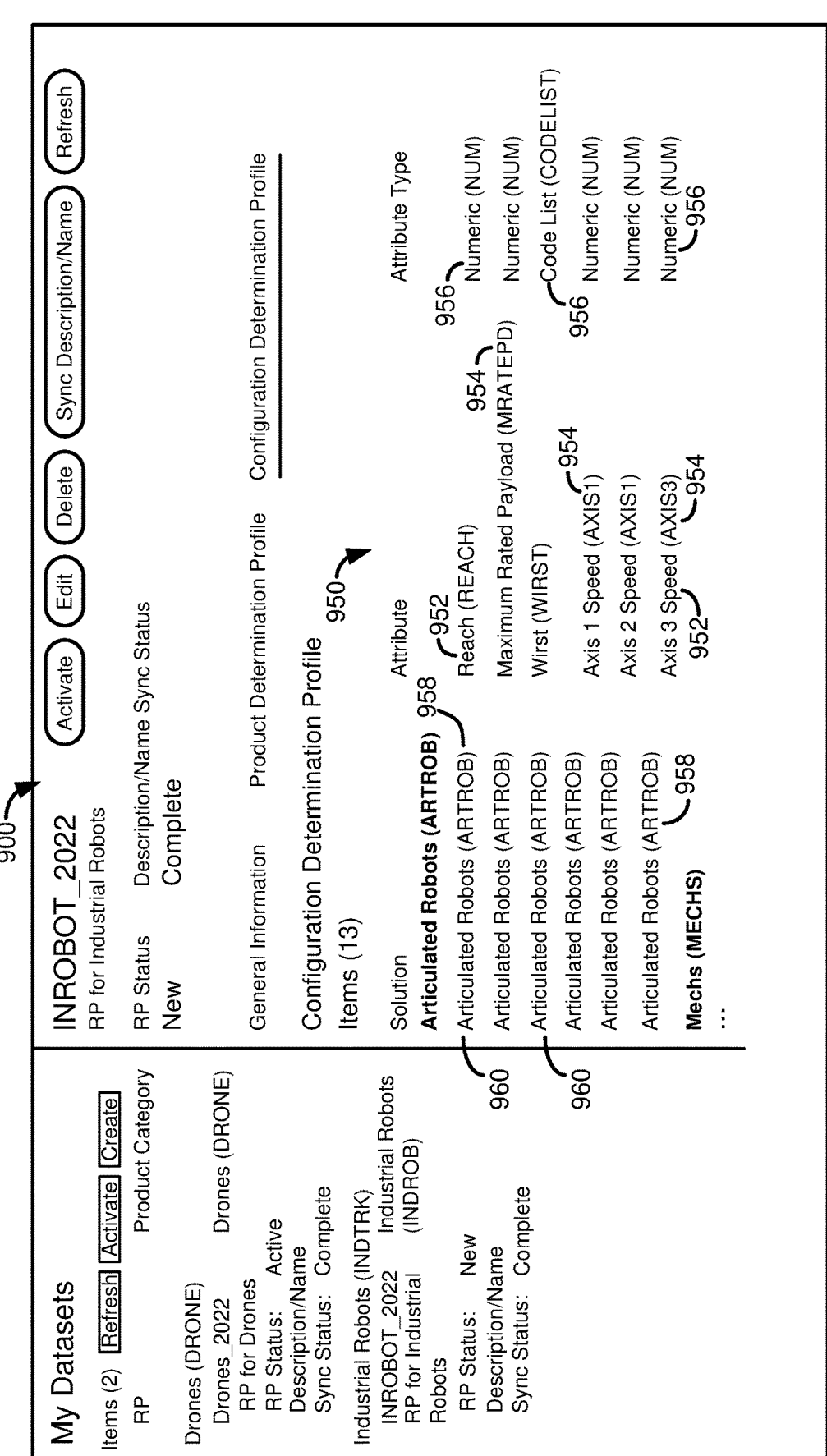

FIGS. 9A and 9B illustrate a user interface screen 900 where a user can select attributes to be used in machine learning models, particularly technical attributes of configurable products/materials in a given solution. As discussed, the present disclosure provides techniques where one machine learning model is used to provide a solution recommendation and another model is used to provide a configuration recommendation for a selected solution. Aspects of a product category used to train and use machine learning models can be collected in a recommendation profile for the category. The recommendation profile can include, or can be linked to, a product/solution structure, as described in connection with FIG. 8. The recommendation profile can also be associated with one or both of configuration attributes or needs attributes used for model training.

The user interface screen 900 provides generic information 910 about a selected recommendation profile, including a code 912 for the profile, a semantic description 914 of the profile, and the code and semantic description 916 of the product category with which the profile is associated.

FIG. 9A illustrates attributes 930 that have been selected for use in a product determination profile-used in training a machine learning model to recommend a particular solution, or to recommend a particular configuration of a particular solution. Information displayed for the attributes 930 includes a semantic name 932 for the attribute, a code 934 for the attribute, and an attribute type (such as a datatype) 936 for the attribute. User interface controls 940, 942 allow a user to, respectively, add or remove attributes.

As discussed, a product/solution structure can be used to retrieve attributes associated with configurable products. This linkage can be used to assist a user in developing recommendation profiles. In particular, a user need not be familiar with data objects that contain the product attributes or how to retrieve such information, such as having to be familiar with a relational database data model or techniques (such as SQL) to access such information. Rather, the user interface screen 900 can have backend logic that is linked to the correct set of data objects (such as tables or views) through the product/solution structure, and can have defined queries for such attributes.

In a particular implementation, logic providing information for the user interface screen 900 can access a data dictionary or information schema of a database to obtain a list of attributes associated with particular configurable materials, as well as their datatypes. In some cases, attributes can be associated with identifiers that can provide information about their nature, such as whether they are technical/ configuration attributes or are needs attributes (which can also be technical) or some other type of attribute. In further implementations, configuration attributes and needs attributes can be stored in different sets of one or more data objects, and queries specific to configuration attributes or needs attributes can be defined and executed, such as upon a user request to add an attribute to the attributes 930.

FIG. 9B also illustrates the user interface screen 900, but now showing a portion of the user interface screen that identifies technical/configuration attributes 950 to be used in determining a configuration for a selected solution (or configurable product within a recommended solution). As with the attributes 930, the display 900 provides a name 952 and an identifier 954 for a given attribute, as well as its datatype 956. For the technical/configuration attributes 950 to be used in solution configuration, the information for the attributes also includes a solution identifier 958 and a solution description 960, where the attributes can also be organized by solution. As described, while configuration attributes for multiple solutions are used in a machine learning model to recommend a solution, a machine learning model that recommends a configuration for a particular solution uses technical/configuration attributes of a specific solution.

Note that particular attributes selected for use in a machine learning model for solution recommendation can be the same as or can differ from attributes used in solution configuration. As a particular example, the attributes 930 of FIG. 9A are somewhat more "general," in that they relate to particular industry sectors and applications, and have particular, overall characteristics, such as a mounting position or a number of units to handle (for example, as measure of a number of units per time unit). Recalling the example of the industrial pumps category, different industry sectors or applications may more commonly use one type of pump than other types of pumps, and thus can be used to recommend a rotary lobe pump over other pump types, although other attributes may affect an overall inference result for input values for a defined set of needs attributes.

On the other hand, the attributes 950 can relate to more specific properties of a given solution/configurable product. Some attributes 950 that are relevant to one solution may not be relevant to another solution. Even if an attribute 950 is generally relevant to multiple solutions, specific available values for such attributes may differ between solutions. Consider the solution of "industrial robots" versus "humanoid robots." While both solutions may use a "reach" attribute, available configuration values may differ between the two solutions. Similarly, available reach values for one type of industrial robot in a solution may be different from available reach values for another type of industrial robot in the solution.

In some cases, the attributes 930 or 950 are associated with a specific data set. However, in many cases there may be many sources of data that include configuration/technical attributes (as well as needs attributes). Even when there is a single source of data usable for model training, it can be useful to filter such data. For example, it may be desirable to limit data to that obtained within a particular time period, or associated with a particular jurisdiction (such as limiting to data to the United States or to the EU).

Figure 10A:
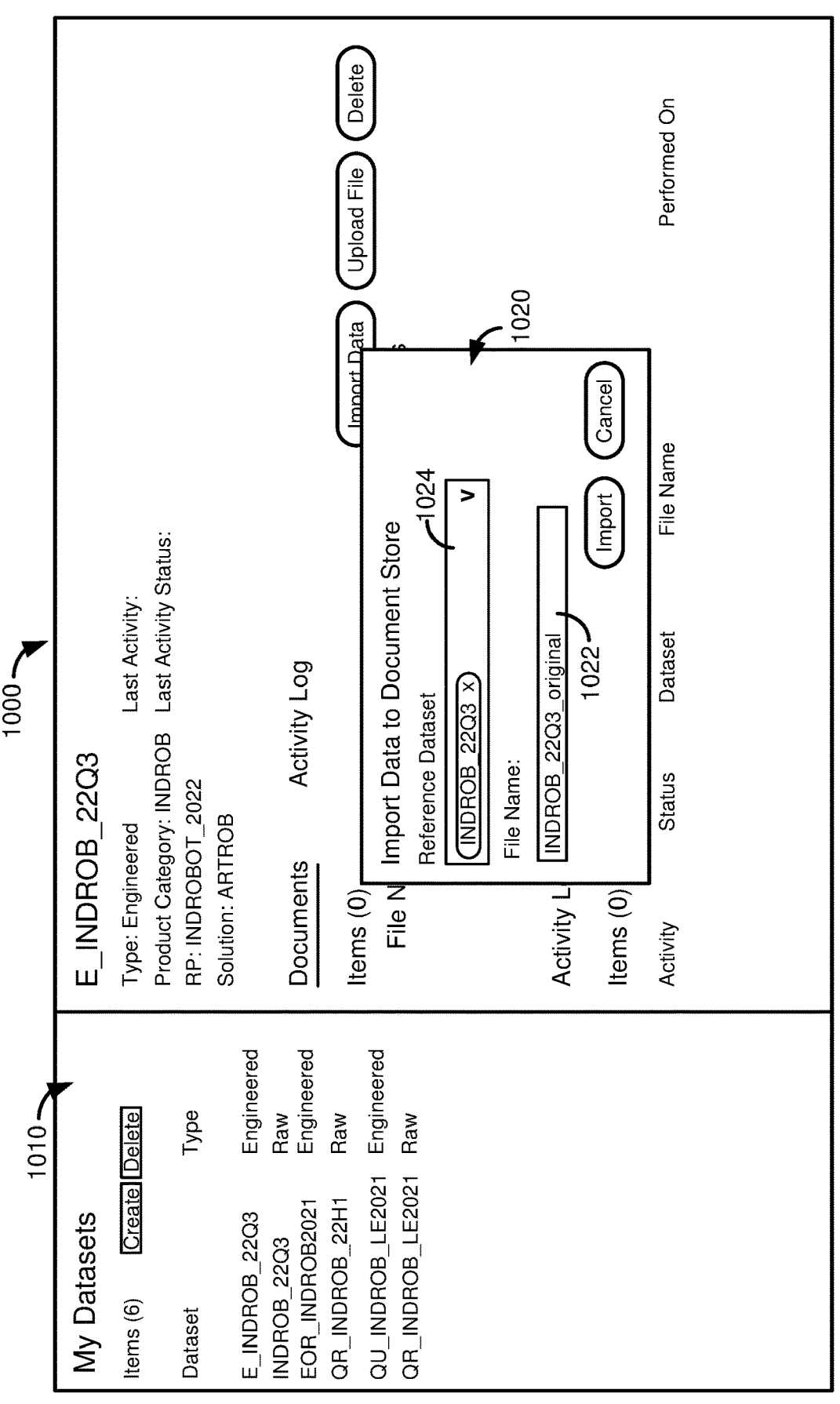

FIG. 10A provides an example user interface screen 1000 that illustrates how data sets, which can provide values for configuration/technical attributes, can be specified (where the data sets can also contain needs attribute values, or where similar techniques can be used for specifying data sources for needs attribute values). The user interface screen 1000 allows a user to add or delete data sets, where available data sets are shown in a panel 1010.

Once a dataset is created, data can be specified for import, such as in an import data dialog box 1020. The dialog box 1020 contains a field 1022 where a user can select a file that contains data to be imported, and a field 1024 where a user can indicate to which datasets the data should be imported. In other cases, data can be manually extracted by a user and saved as the file to be imported using the field 1024. That is, the file can represent saved query results.

Note that a dataset to be imported can be specified with respect to one or more objects (such as database tables or views), where by default all data for the relevant attributes (needs, configuration/technical) is imported, or where a user can optionally be allowed to specify various filters for data import, such as restricting data to a particular date range or restricting an attribute, which can be one of the attributes to be imported or a different attribute, to a particular set of one or more values. Thus, alternatively to providing the dialog box 1020, a dialog box can be provided that allows a user to enter a query directly, to specify a saved query, or to enter a query in a guided manner, such as selecting a data source and various filter parameters to be used in data retrieval, where appropriate data retrieval commands (such as in SQL) can be generated and executed, including limiting results to a particular set of attributes defined in a recommendation profile (e.g., "SELECT [attribute set from recommendation profile] FROM [specified data source] WHERE [filter conditions, such as a date range]."

Data sets can also be downloaded, such as for editing/ manipulation, or such capabilities can be integrated into the guided recommendation process of this Example 7 (such as by providing a user interface screen that provides functionality for editing a data set, including as further described below for a downloaded file). An initial data set can be considered a "raw" data set, which in some cases can be used without modification, or the data set can be modified for use to provide an engineered data set that is used for model training.

FIG. 11 illustrates an example raw data set presented in a table 1100. The table 1100 includes a column 1110 that indicates a type of document (which is typically an electronic document that is defined with respect to one or more underlying database tables, but is implemented as a higher-level object to facilitate user interaction with the underlying data). A column 1112 indicating a date of the document, which, as mentioned, can be used as a filter criterion. Columns 1114-1134 provide values for various attributes defined for the document type, which can be limited to attributes defined in a recommendation profile, or can include additional attributes. Examples of document types include sales order, sales quotes, solution orders, or solution quotes, such as implemented in technologies available from SAP SE, of Walldorf, Germany.

In creating an engineered data set, a user can review the raw data set and identify data they wish to exclude from consideration, which can include filtering the data in the table 1100 using specified values for one of the attributes (columns 1110-1134), or can include removing specific rows from the table 1100. For example, the table 1100 has rows 1150, 1152 with a value of "XXXXXXXX" for the document date column 1112, which can indicate potentially erroneous, or at least incomplete, data.

Figure 10B:
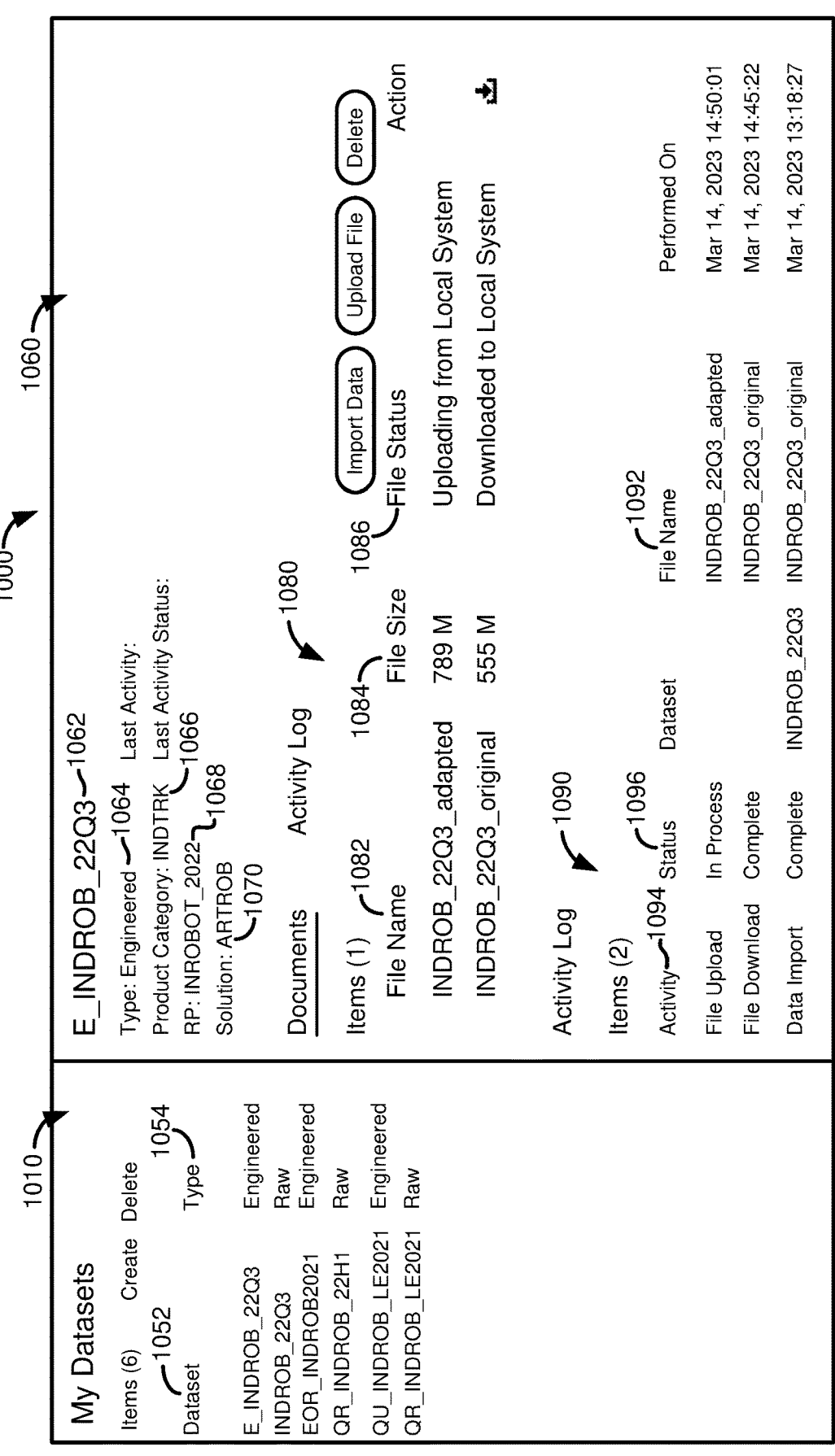

FIG. 10B illustrates the user interface screen 1000 after importing raw data and the creation of engineered data sets. The panel 1010 that lists available data sets includes an identifier 1052 of the data set and an identifier 1054 of the type (raw or engineered) of the data set. A panel 1060 provides details for a selected dataset 1062, including identifiers of its type 1064, product category 1066, associated recommendation profile 1068, and solution 1070.

A "documents" section 1080 of the user interface screen 1000 provides details of files associated with a data set, including a name 1082 of the file, a size 1084 of the file, and a status 1086 of the file, where the status can indicate whether the file is uploaded to the system or downloaded from the system, and a status of such upload or download. An activity log 1090 can display file activities that have occurred for particular files 1092, includes a type of action 1094 (such as import, download, or upload), and a status 1096 of such action (such as failed, completed, or in process).

Figure 12A:
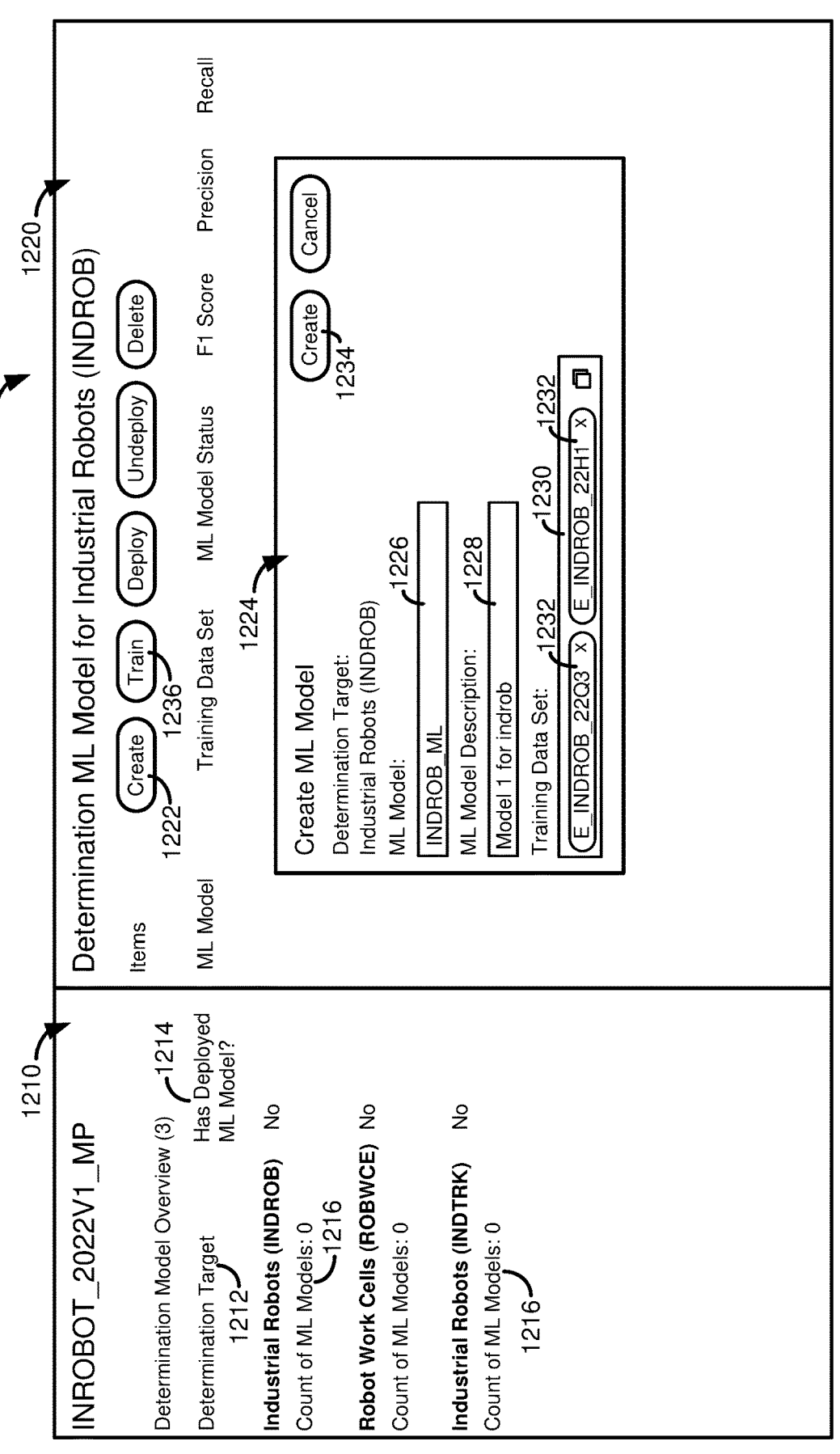
Figure 12B:
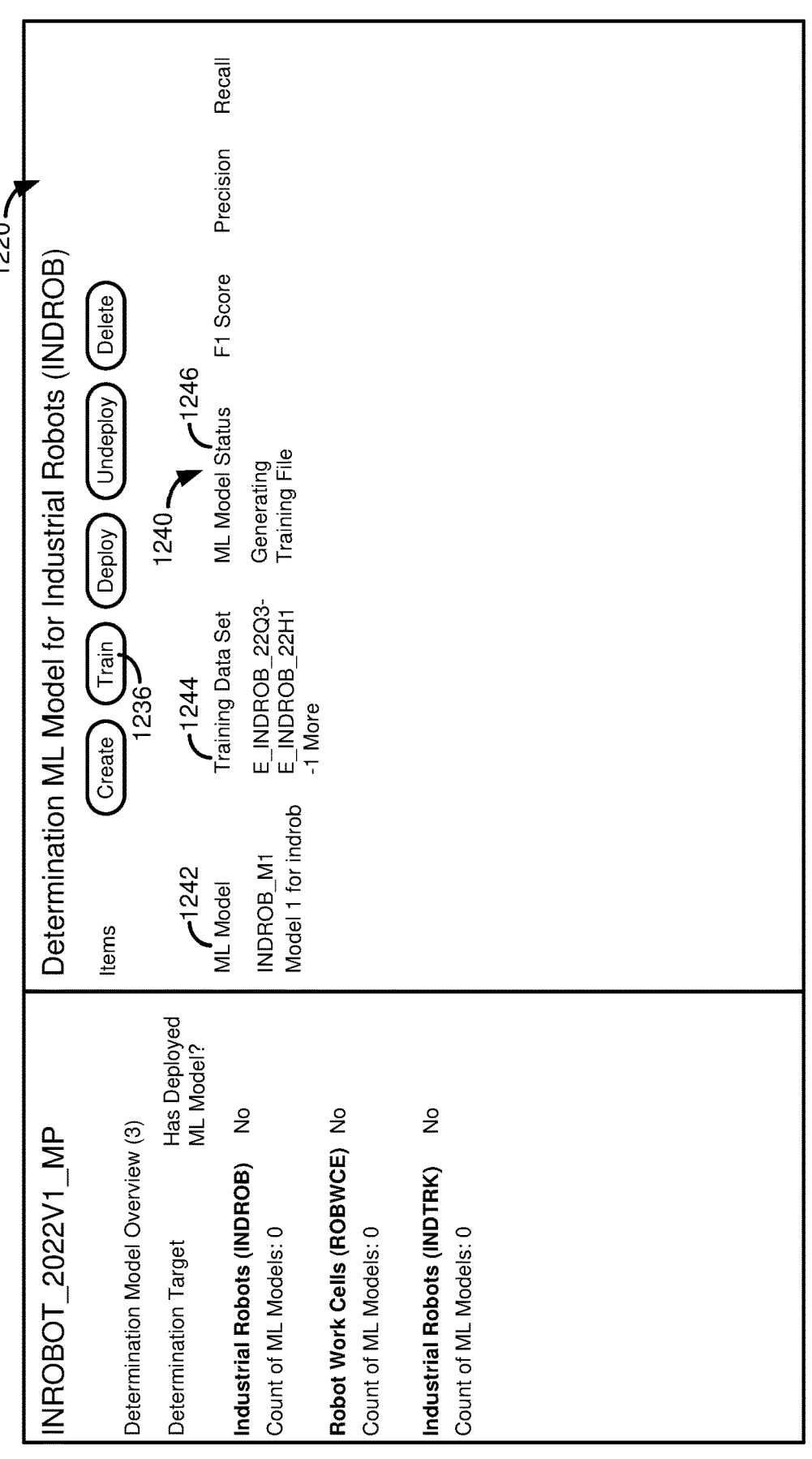
Figure 12C:
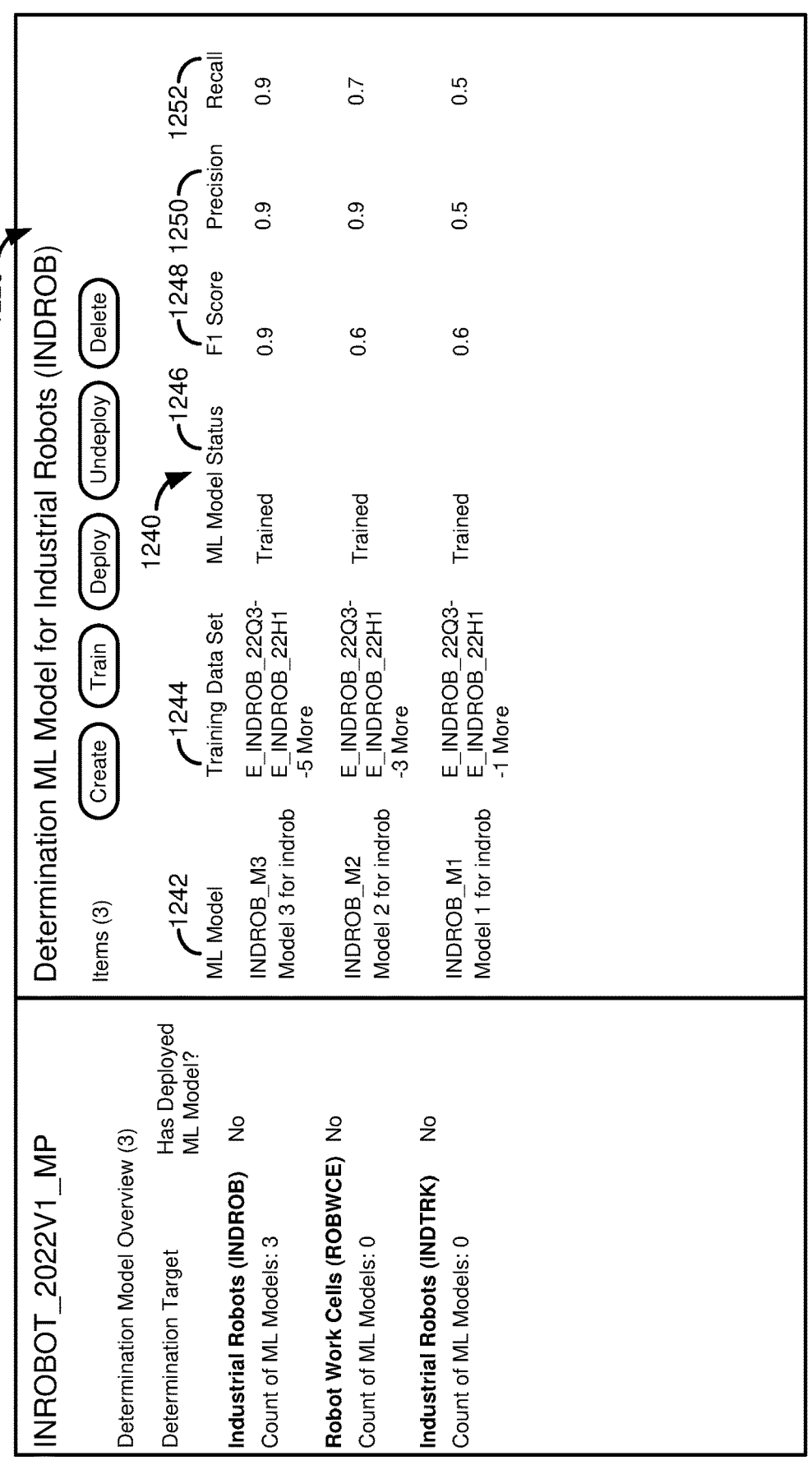

FIGS. 12A-12C illustrate how disclosed techniques facilitate a user in generating trained machine learning models for a guided recommendation process. As has been described, an overall process of generating a guided recommendation process can involve creating a product/solution structure, specifying particular needs and configuration/attributes to be used in model generation, and identifying particular data sets for use in model training. FIGS. 12A-12C use prior stages of the scenario to create trained machine learning models that are ready to be implemented in the scenario. In this way, disclosed techniques provide a "low code" or "no code" method of generating machine learning models, since a user need only identify relevant inputs and the implementing logic uses the inputs, for example, to retrieve appropriate data for model training and use a defined (i.e., preset, preconfigured) machine learning algorithm for training. A user need not have technical knowledge to create data objects to use training data, to retrieve training data, or to implement and train a machine learning model.

FIG. 12A illustrates a user interface screen 1200 used to create a new machine learning model. A panel 1210 of the user interface screen 1200 identifies various "determination targets" 1212, which can represent product categories or recommendation profiles associated with a product category. The panel 1210 includes a column 1214 indicating whether a machine learning model has been deployed or activated for a particular recommendation profile, and can include identifiers 1216 indicating a number of machine learning models that have been defined for a recommendation profile.

A panel 1220 of the user interface screen 1200 provides information about machine learning models for particular recommendation profiles, and allows a user to create, train, deploy, undeploy, or delete machine learning models.

FIG. 12A illustrates the panel 1220 after the selection of a user interface control 1222 for creating a machine learning model. In this example implementation, a dialog box 1224 is displayed, which includes a text entry field 1226 for providing a name/identifier for the machine learning model to be created, a text entry field 1228 in which a semantic description of the machine learning model can be provided, and an entry field 1230 through which a user can select one or more data sets 1232 to be used in training the machine learning model, such as the data sets as described in conjunction with FIGS. 10A, 10B, and 11. A selection of a "create" user interface control 1234 causes the machine learning model to be created, including linking the machine learning model to the data sets selected using the field 1230. In this specific implementation, the model is created, but training is not initiated as part of model creation, but rather as part of a separate step described with respect to FIG. 12B. In other implementations, the model can be trained after assigning a model identifier and selecting the desired training set or sets.

FIG. 12B illustrates the user interface screen 1200 after the selection of a "train" user interface control 1236 of FIGS. 12A and 12B. Selection of the control 1236 causes a model to be trained using a machine learning algorithm and the selected data sets. The panel 1220 is shown as including a listing 1240 of machine learning models created for a particular recommendation profile, including an identifier 1242 of the model, an identifier 1244 of the training data sets used in model training, and an identifier 1246 of a status associated with the machine learning model (such as trained, training in process, untrained, or failed).

Note that the embodiment shown in FIGS. 12A-12C does not provide options for selecting a particular machine learning algorithm (such as a predefined/preconfigured neural network). In this case, a specific machine learning algorithm can be specified for the particular use case of generating a guided recommendation scenario. Optionally, different machine learning algorithms can be selected based on the nature of the attributes or training data, or a specific machine learning algorithm can be configured (such as configuring hyperparameters of the machine learning algorithm) based on such information.

Providing a determined machine learning model can facilitate creation of guided recommendation processes, since a user need not be familiar with different machine learning models, their capabilities and limitations, or how to configure such models for use. In other cases, a variety of available machine learning algorithm can be provided to a user for user selection (or the user can proceed with a default algorithm), but where backend logic is configured to format the training data for use by a selected machine learning algorithm, so that the user need not have technical expertise with machine learning models.

FIG. 12C reflects the panel 1220 after the training of several machine learning models for the selected recommendation profile. Note that the listing 1240 of machine learning models has different identifiers 1244 for the different data sets used for model training where, as illustrated, a difference between models can be a number of training data sets used for model training. Each model is associated with metrics for model performance, including an F1 score metric 1248 (for example, the harmonic mean of precision and recall for the model), a precision metric 1250 (a measure of false positive results), and a recall metric 1252 (a measure of false negative results). The model performance metrics 1248-1252 can be useful, for example, in assisting a user in determining a particular machine learning model to be deployed (that is, used productively in a guided recommendation scenario, such as described in Example 6).

Example 8—Additional Example User Interface Screens for Defining a Guided Recommendation Process FIGS. 13A-13I present another example set of user interface screens depicting a process for creating a guided recommendation process (also referred to as a "guided recommendation scenario"), including defining a product/solution structure, defining needs and configuration/technical attributes, creating data sets, and creating trained machine learning models. Generally, the user interface screens, and their use, are similar to the user interface screens in FIGS. 8, 9A, 9B, 10A, 10B, and 12A-12C, and so are not described in detail.

Figure 13A:
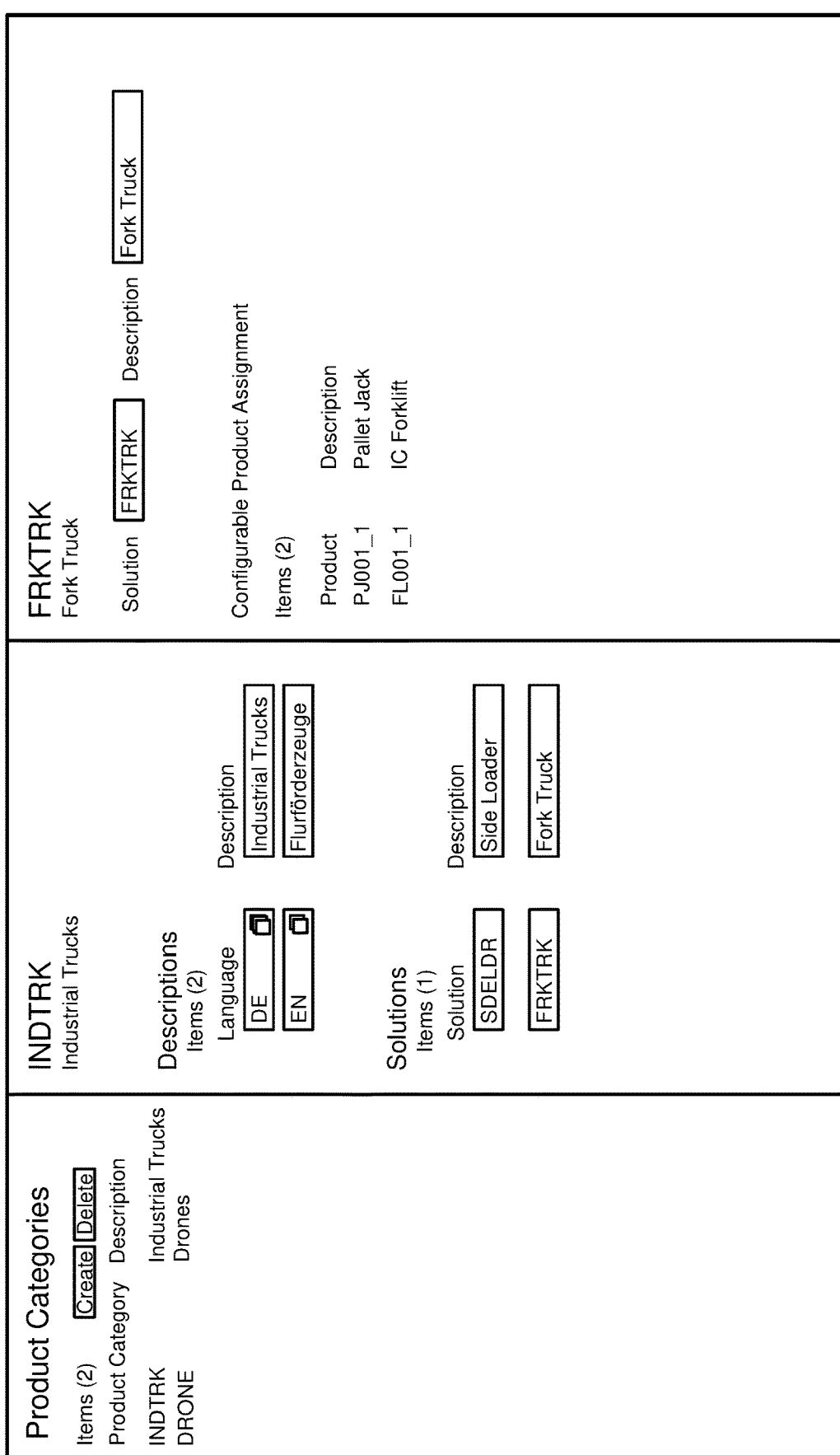
Figure 13B:
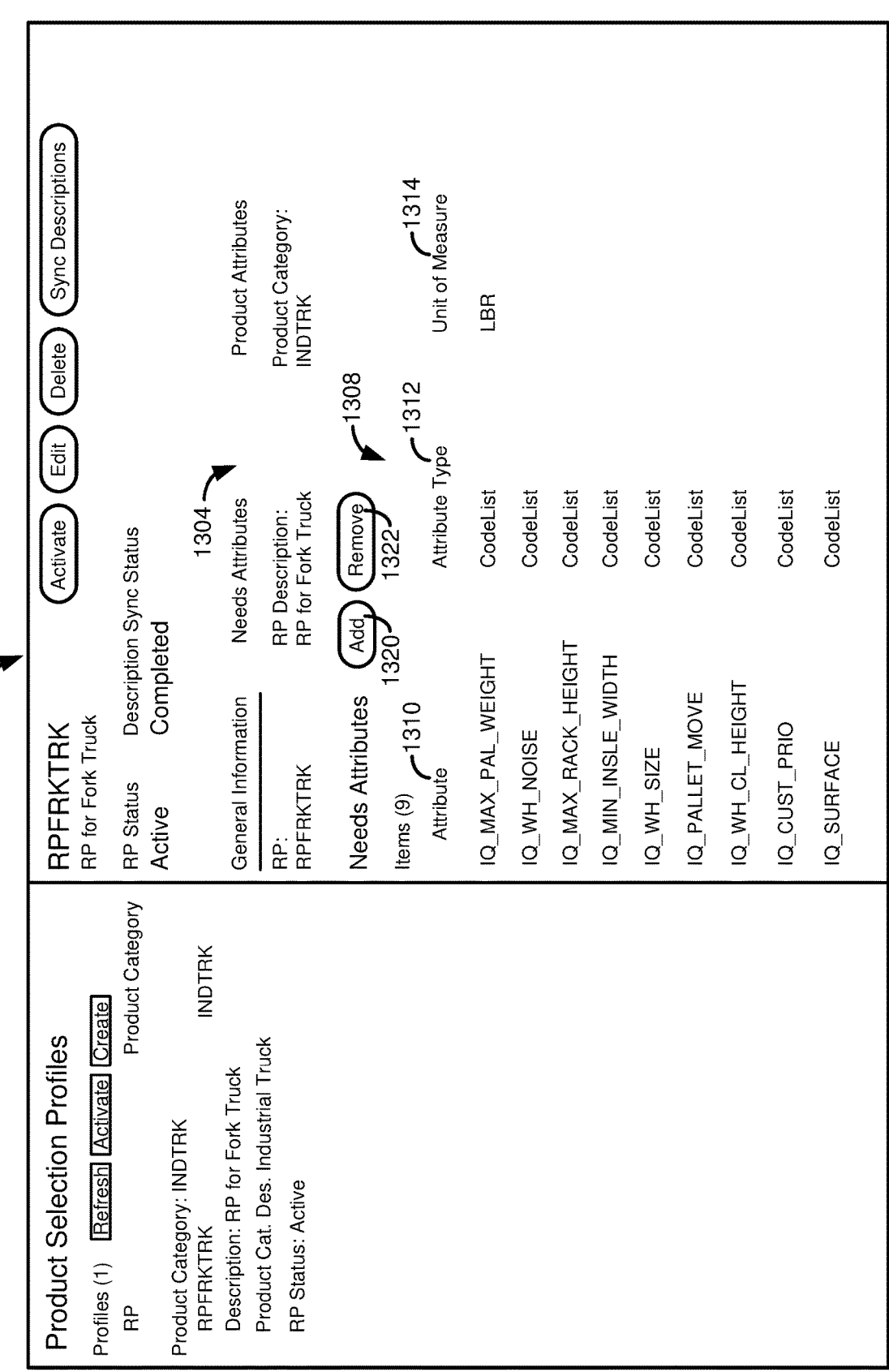
Figure 13C:
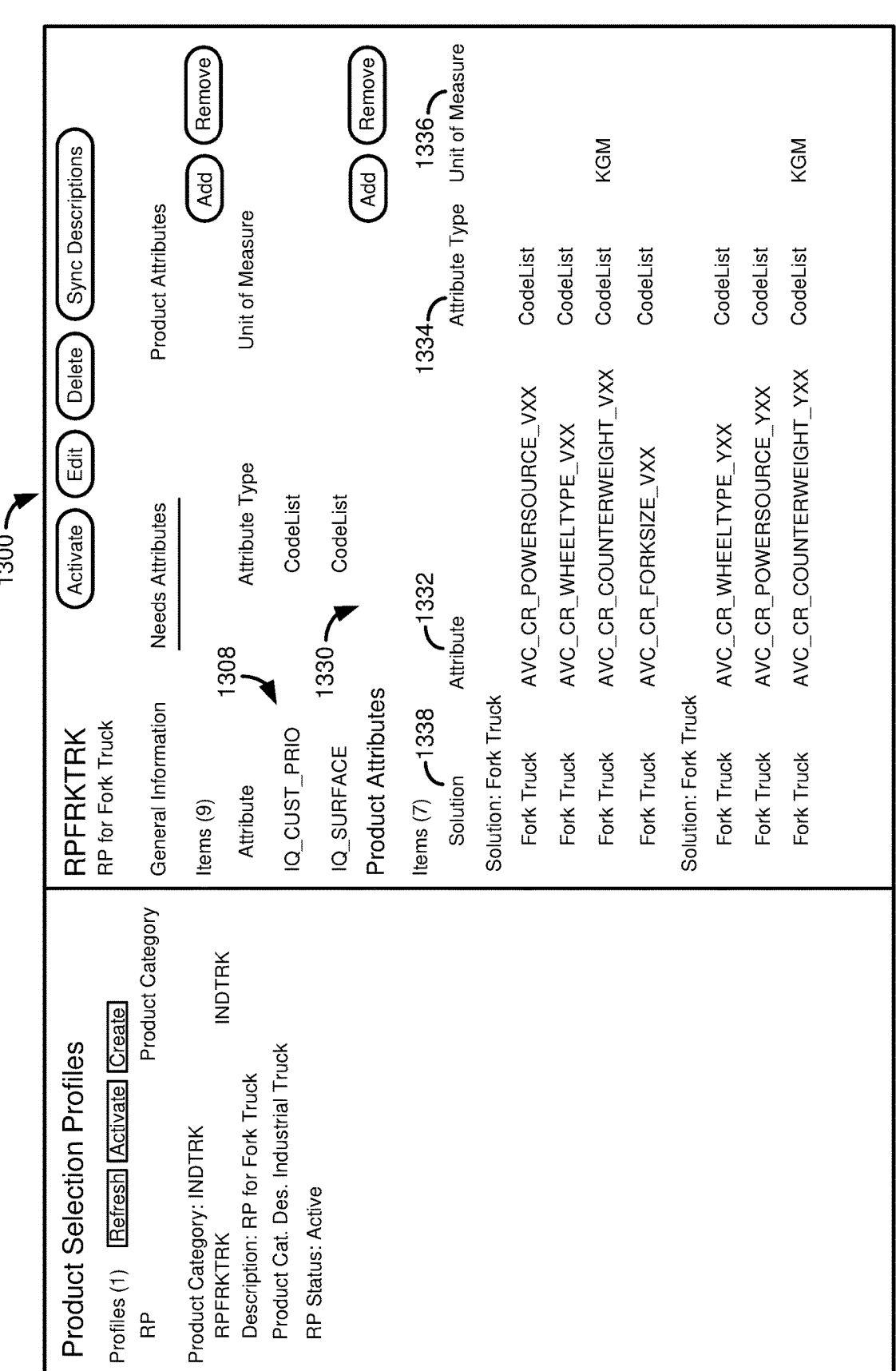
Figure 13D:
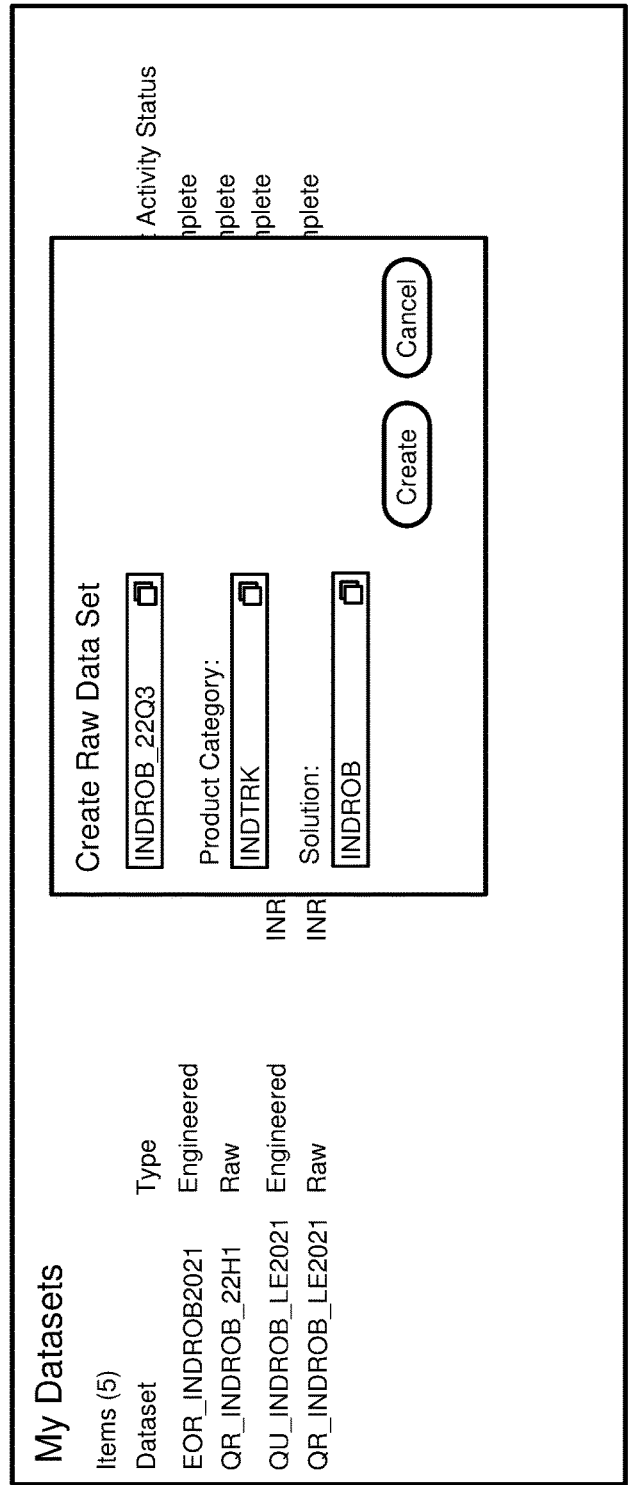
Figure 13E:
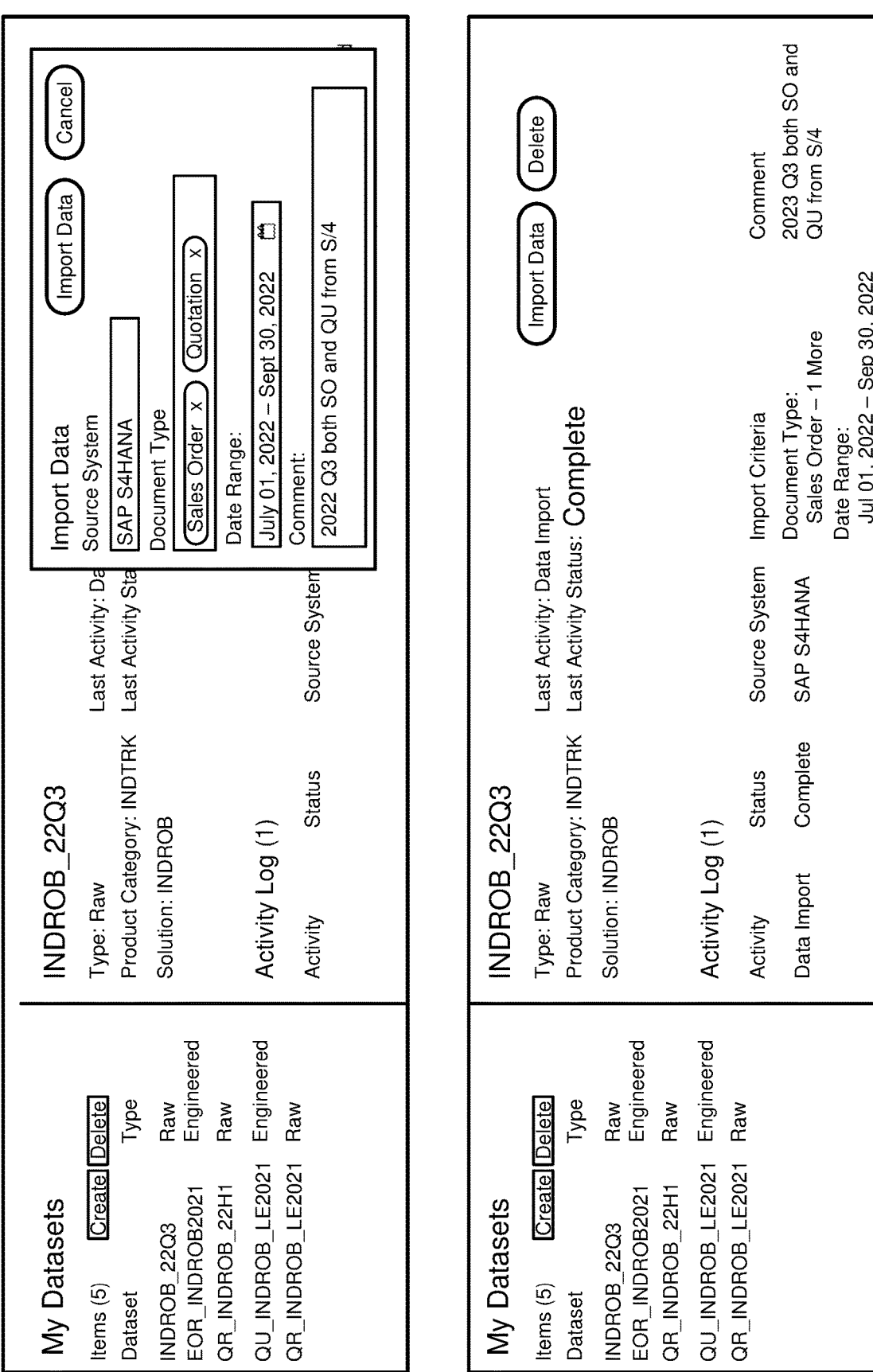

Specific attention is called, however, to FIGS. 13B and 13C, which illustrate a user interface screen 1300 that depicts a process of defining needs and technical/configuration attributes for a particular product category and for solutions within the category. Along with general information 1304 for the product category and its recommendation profile, FIG. 13A lists needs attributes 1308, including an identifier 1310 of the attribute, an attribute type identifier 1312, and a unit of measure identifier 1314. The needs attributes 1308 are also shown at the top of FIG. 13B, which represents a user "scrolling down" the user interface screen. The user interface screen 1300 includes controls 1320, 1322 that allow a user to add or remove needs attributes.

FIG. 13C also includes a listing of "product attributes" 1330, which includes configuration/technical attributes, and can in some cases can include other types of attributes (such as cost, lead time). As with the attributes 1308, for the attributes 1330, the user interface screen 1300 presents an attribute name 1332, an attribute type 1334, and an attribute unit of measure 1336. Information for the attributes 1330 also includes an identifier 1338 for a particular solution with which the attribute is associated (where in some cases a particular attribute can be associated with multiple solutions). The identifier 1338 can be used to select attributes 1330 for a configuration machine learning model for a specific solution (such as "SELECT [configuration attributes] FROM [attribute list] WHERE [solution-=X]." In the case of training a solution recommendation machine learning model, attributes 1330 for all solutions (or a specific subset of solutions) can be selected (such as "SELECT [configuration attributes] FROM [attribute list]."

Example 9—Example Data Models Useable in Guided Recommendation Processes

Figure 14:
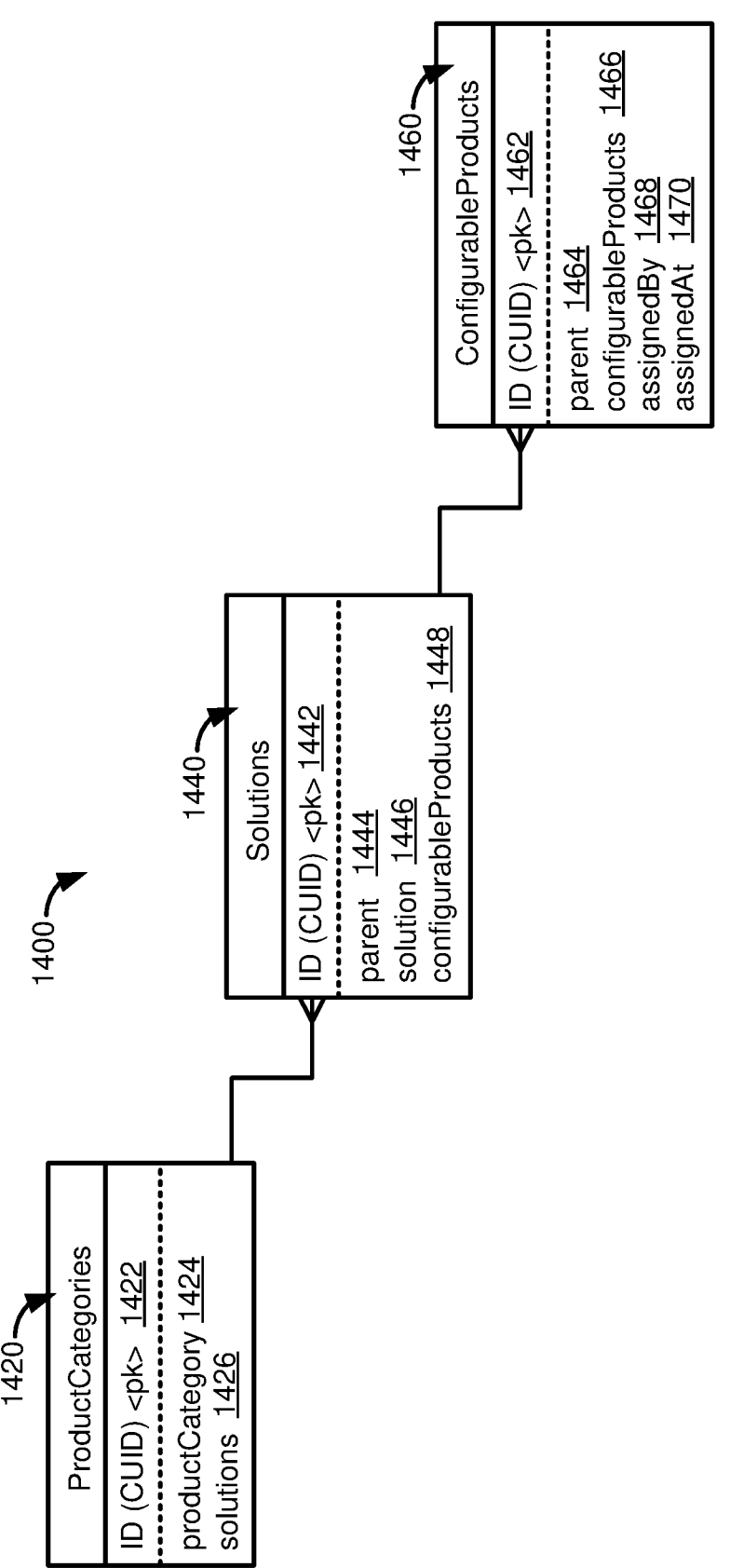
FIGS. 14-17 illustrate example data models that can be used in implementing a guided recommendation process.

FIGS. 14-17 provide example data models that can be used for storing and retrieving data for various disclosed functionalities. In particular, FIG. 14 illustrates a data model 1400 that can be used in defining product/solution structures. The data model 1400 includes an object 1420 representing a product category, an object 1440 representing solutions that can be included within a product category, and an object 1460 representing configurable products that can be included in a product category/associated with a particular solution. The objects 1420, 1440, 1460 can be implemented as relational database tables, although they can be implemented in other manners. For example, the objects 1420, 1440, 1460 can be implemented as abstract or composite datatypes, such as class definitions, where the properties of the objects (which will be further described) can be member variables of the object, in comparison with a relational database implementation where the properties form attributes of relational database tables (or a denormalized table that includes properties of all of the objects). Similar implementation options can be used for other data models described in this Example 9.

The properties of the product category data object 1420 include an identifier 1422, which can be a CUID (cluster unique identifier) or another type of identifier (such as globally unique identifier (GUID) or a universally unique identifier (UUID)). In the case where the data object 1420 is implemented as a relational database table, the identifier 1422 can serve as its primary key.

The product category data object 1420 can also include a product category property 1424 and a solutions property 1426. The values of the product category property 1424 can indicate a particular product category, while values of the solutions property 1426 identify particular solutions associated with a particular product category. According to the definition of the product category object 1420, in the case of a table implementation, the object can have multiple rows for a given product category (value of the property 1424), since a given product category can have multiple solutions. In addition, a given solution (value of the property 1426) can, at least in some cases, be associated with multiple product categories.

Turning to the solutions data object 1440, the solutions object can include a property 1442 that serves as an identifier of a particular instance of the solutions data object 1440, such as a CUID (or GUID or UUID). In a particular implementation, values of the property 1442 are used as values for the solution property 1426 of the product category data object 1420. A given solution can be linked to a particular product category of the product category data object 1420 by providing a value of the product category property as a value for a parent property 1444 of the solutions data object 1440.

An identifier, such as a name of a solution can be provided as value of a solution property 1446, while a configurable product property 1448 can indicate a particular configurable product (instance of the configurable product object 1460) that is associated with the solution. The definition of the solutions data object 1440 can allow multiple configurable products to be specified for a given solution (value of the solution property 1446), and a given configurable product can optionally be associated with multiple solutions (and in turn multiple product categories).

The configurable products data object 1460 includes an identifier property 1462, which can be implemented as a CUID (or a GUID or UUID). Values of the identifier property 1462 can be used as values for the configurable product property 1448 of the solutions data object 1440. A given configurable product can be linked to a particular solution of the solutions data object 1440 by providing a value of the property 1442 as a value for a parent property 1464 of the configurable products data object 1460.

The configurable product data object 1460 can further include a configurable product property 1466, which can indicate a particular configurable product. In at least some implementations, a configurable product can be associated with multiple parent configurable products, and so the use of the identifier property 1462 and the configurable product property 1466 can allow for multiple instances of a given configurable product property value, where different instances of the multiple instances can indicate the configurable product in use with different parent configurable products.

Figure 15:
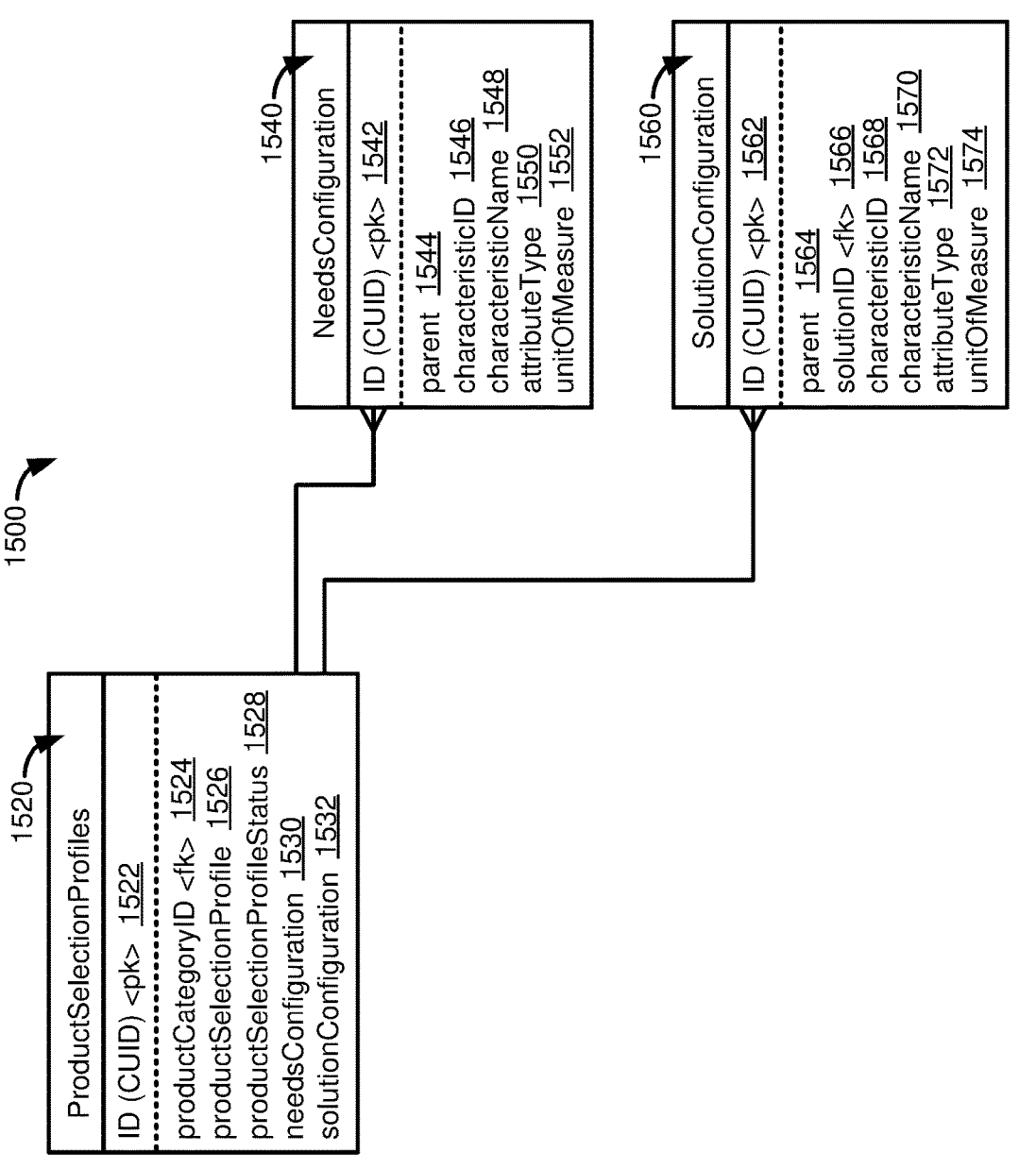

FIG. 15 illustrates a data model 1500 that represents a recommendation profile, referred to in FIG. 15 as a product selection profile. The data model 1500 includes a product selection profile data object 1520, a needs configuration data object 1540, and a solution configuration data object 1560.

The product selection profile data object 1520 includes an identifier property 1522, which can be a CUID (or a GUID or UUID) and, when the product selection profile object is implemented as a table, can serve as its primary key. A product category identifier property 1524 identifies a particular product category for an instance of the product selection profile data object 1520, and can be a foreign key that is associated with primary key values of the product category data object 1420 of FIG. 14.

The product selection profile data object 1520 can also include a product selection profile property 1526, which can provide a particular name or identifier for a product selection profile, and a property 1528 can indicate a particular status associated with the profile, such as whether the profile is deployed, not deployed, active, not active, completed, or incomplete. A needs configuration property 1530 identifies a particular instance of the needs configuration data object 1540 with which an instance of the product selection profile data object 1520 is associated, while a solution configuration property 1532 identifies a particular instance of the solution configuration data object 1560 with which the product selection profile instance is associated. Note that the definition of the product selection profile data object 1520 provides that multiple product selection profiles can be associated with a given product category (reflected in the property 1524).

The needs configuration data object 1540 includes an identifier property 1542, which can be a CUID (or a GUID or UUID), and which can serve as primary key when the needs configuration data object 1540 is implemented as a relational database table. A given instance of the needs configuration data object 1540 can be linked to a particular product selection profile of product selection profile data object 1520 by providing a value of the property 1522 as a value for a parent property 1544 of the needs configuration data object 1540.

As has been described, a set of needs of attributes is specified for a recommendation profile. Needs attributes can be indicated in the needs configuration data object 1540 using a characteristic identifier property 1546, a characteristic name property 1548, an attribute type property 1550, and a unit of measure property 1552.

The solution configuration object 1560 is generally similar to the needs configuration data object 1540, in that it includes an identifier property 1562, a parent property 1564 (linking an instance of the solution configuration object 1560 to an instance of the product selection profile data object), a characteristic identifier property 1568, a characteristic name property 1570, an attribute type property 1572, and a unit of measure property 1574. While all of the needs characteristics (also referred to as "attributes") identified in the needs configuration data object 1540 are used as input for a solution recommendation model for a particular product category/recommendation profile, the characteristics identified in the solution configuration data object 1560 can be used collectively for a given product category/recommendation profile, in solution recommendation model, or on a solution-by-solution basis, in the case of a configuration recommendation model. The solution configuration data object 1560 accordingly includes a solution identifier property 1566, which, in the case of a relational database implementation, can be a foreign key that is associated with a value of the identifier property 1442 of the solutions data object 1440 of FIG. 14.

Figure 16:
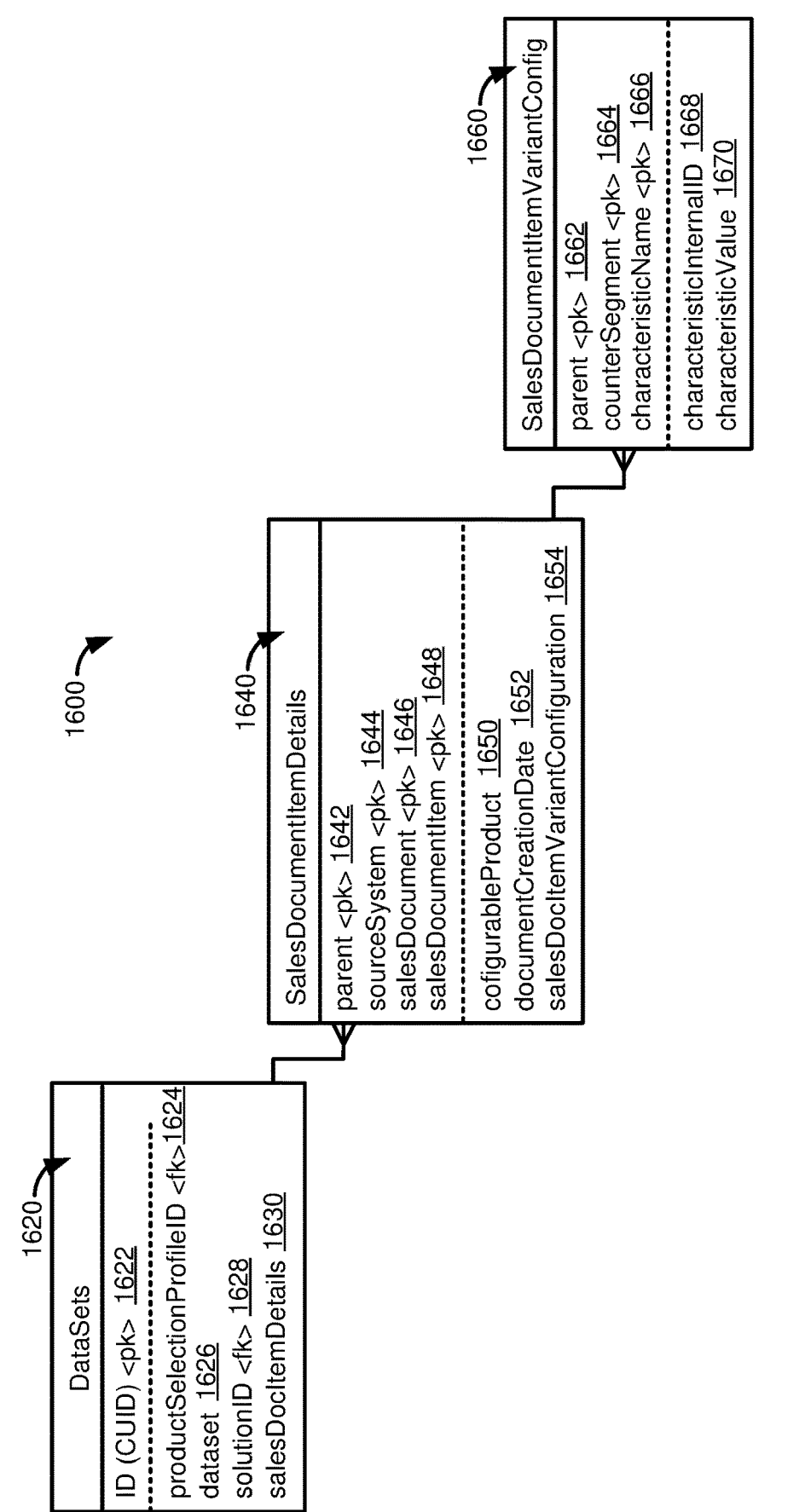

FIG. 16 presents a data model 1600 that can be used to associate data, such as for use in training of a machine learning model, with a product selection profile (also referred to earlier as a recommendation profile), including as described with respect to the data model 1500 of FIG. 15.

The data model 1600 includes a data sets data object 1620, a sales document item details data object 1640, and a sales document item variant configuration data object 1660. The data sets data object 1620 can include an identifier property 1622, which can be a CUID (or a GUID or UUID) and, when the data sets data object is implemented as a relational database table, can serve as the primary key for the table. A product selection profile identifier property 1624 serves to link a given data set (instance of the data sets data object 1620) to a particular product selection profile, such where a value of the product selection profile identifier property is a foreign key that is associated with a primary key value (value of the property 1522) of the product selection profile data object 1520 of FIG. 15.

The data sets data object 1620 also includes a data set property 1626, which provides a name/identifier of a particular data set. A given instance of the data sets data object 1620 is associated with a particular solution (such as an instance of the solutions data object 1440 of FIG. 14) using a solution identifier property 1628, which can be a foreign key that is associated with a primary key value (value of the identifier property 1442) of the solutions object. The data sets data object 1620 also includes a sales document item details property 1630, which can be used to link an instance of the data sets data object with an instance of the sales document item details data object 1640.

Generally, the sales document item details data object 1640 relates to configurable products that are associated with electronic implementations of particular sales documents, which are a source of training data. Examples of sales documents include inquiries, quotations, contracts, scheduling agreements, sales order, delivery documents, or billing documents (including as implemented in technologies available from SAP SE, of Walldorf, Germany). In particular implementations, a sales document can be associated with a header (such as reflected in a header table), which can include general information about a particular document instance (such as a particular supplier/customer), and item information (such as in an item table), where the item information can relate to specific items associated with the document and having the header information in common. For example, if a sales document reflected the sale of multiple products, the overall transaction may be associated with a single entry in a header table, while particular products sold via the sales document are reflected as entries in the item table.

A given sales document item can be associated with a configurable product, where details about particular attributes/characteristics of a particular instance of the configurable product are described in a variant configuration (such as implemented in technologies available from SAP SE, of Walldorf, Germany).

A given instance of the sales document item details data object 1640 can be linked to a particular instance of the data sets data object 1620 by providing a value of the property 1622 as a value for a parent property 1642 of the sales document item details data object.

It may be useful to track where data originated from, and so a source system (such a particular software installation) can be identified using a source system property 1644. The particular sales document with which the sales item is associated can be identified using a sales document property 1646, and an identifier for the particular sales item can be identified using a sales document item property 1648. The properties 1642, 1644, 1646, 1648 can, when the sales document item details data object 1640 is implemented as a relational database table, serve as a primary key for the table.

A configurable product associated with a sales item can be identified using a configurable product property 1650. A date the sales document (property 1646) was created can be identified using a document creation date property 1652. A particular configuration variant of the configurable product (property 1560) can be identified using a sales document item variant configuration property 1654, which can identify a particular instance of a variant configuration included in the sales document item variant configuration data object 1660.

A given instance of the sales document item variant configuration data object 1660 can be linked to a particular instance of the sales document item details data object 1640 by providing a value of the property 1642 as a value for a parent property 1662 of the sales document item variant configuration data object.

Documents can be quite complex, and in at least some implementations (including in variant configurations as implemented in technologies of SAP SE, of Walldorf, Germany), information can be maintained in defined "segments." In order to help retrieve suitable property values, the sales document item variant configuration data object 1640 can include a segment identifier property 1664. A name of a particular characteristic of a variant can be indicated using a characteristic name property 1666, while an internal identifier (such as a code) can be provided using an internal identifier property 1668, and a value of the characteristic can be provided using a characteristic value property 1670.

When the sales document item variant configuration data object 1660 is implemented as a relational database table, the properties 1662, 1664, and 1666 can serve as a primary key.

Figure 17:
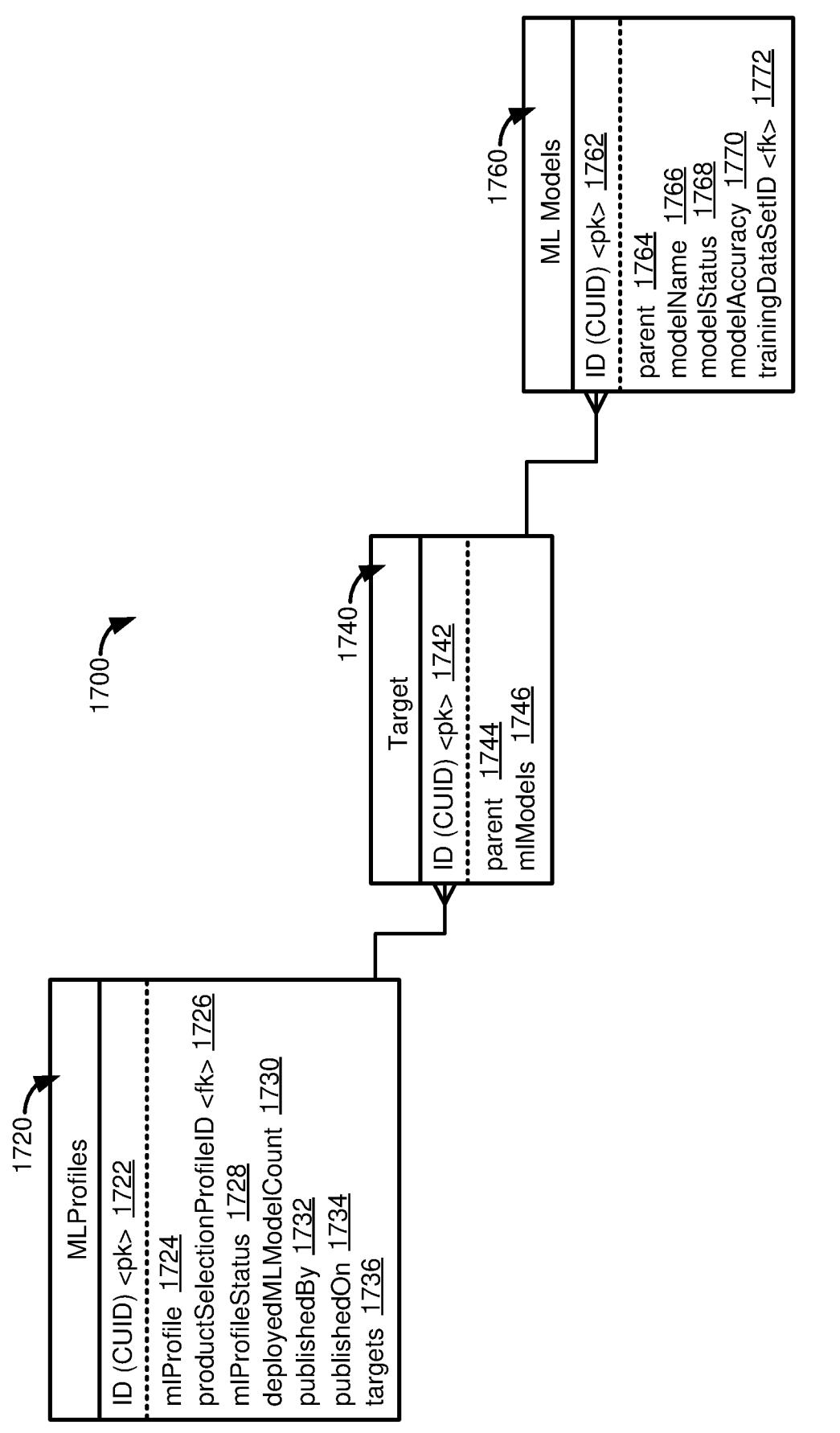

FIG. 17 illustrates a data model 1700 that can be used to associate product selection profiles (also referred to as recommendation profiles) with machine learning models. The data model 1700 includes a machine learning profile data object 1720, a target data object 1740, and a machine learning models data object 1760.

The machine learning profile data object 1720 can be used to summarize information regarding machine learning models associated with a product selection profile, as well as to link the profile to particular trained models and information identifying data sets used for model training. The machine learning profile data object 1720 includes an identifier property 1722, which can be a CUID (or a GUID or UUID). When the machine learning profile data object 1720 is implemented as a relational database table, the identifier 1722 can serve as its primary key.

A machine learning profile property 1724 can provide a name or other identifier of a machine learning profile, while a product selection profile identifier property 1726 can link an instance of the machine learning profile data object 1720 to a particular product selection profile. For example, when data objects are implemented as relational database tables, the product selection profile identifier property 1726 can be a foreign key that is associated with a particular primary key value (value of the identifier property 1522) of the product selection profiles data object 1520 of FIG. 15.

A property 1728 can indicate a status of the machine learning profile, such as whether it has been "created," "published," or "unpublished." A property 1730 can be used to indicate a number of deployed machine learning models associated with an instance of the machine learning profile data object 1720. Properties 1732 and 1734 can, respectively, indicate, for published machine learning profiles, a date the profile was published and an identifier of a user who published the profile. A targets property 1736 can be used to link a machine learning profile with particular trained machine learning models, such as particular instances of the target data object 1740.

The target data object 1740 can have an identifier property 1742, which can be a CUID (or a GUID or UUID). A given instance of the target data object 1740 can be linked to a particular instance of the machine learning profile data object 1720 by providing a value of the property 1722 as a value for a parent property 1744 of the target data object.

The target data object 1740 includes a machine learning models property 1746, which is used to link targets to particular trained machine learning models, which are instances of the machine learning models data object 1760.

The machine learning model data object 1760 includes an identifier property 1762, which can be a CUID (or a GUID or UUID). When the machine learning model data object 1760 is implemented as a relational database object, the identifier property 1762 can serve as its primary key, and values of the identifier property can be values for the machine learning models property 1746 of the target data object 1740.

A given instance of the machine learning model data object 1760 can be linked to a particular instance of the target data object 1740 by providing a value of the property 1742 as a value for a parent property 1764 of the machine learning model data object.

Properties 1766, 1768, and 1770 are used to provide information about a particular trained model, where the properties, respectively, provide a name of the model, indicate a status of the model (for example, trained, training in process, untrained, deployed, not deployed), and model accuracy information. A particular training data set used to train a given machine learning model of the machine learning models data object 1760 can be indicated by a value of a training data set identifier property 1772. When the machine learning models data object 1760 is implemented as a relational database table, the training data set identifier property 1772 can be a foreign key, which is associated with primary key values (values of the identifier property 1622) of the data sets data object 1620 of FIG. 16.

Example 10—Example Operations

FIG. 18 provides a flowchart of a process 1800 of obtaining a recommendation of a configuration for a configurable object of a recommended configurable object class type. At 1804, first input user input is received of a first set of input values of a first type. A first machine learning recommendation is generated at 1808, the first machine learning recommendation including instances of a plurality of configurable object class types, using a first machine learning model trained using a training data set comprising values of the first type and values of a second type, the second type being different than the first type, where the values of the second type are used as training labels for values of the first type. At 1812, second user input is received of an instance of a configurable object class type of the instances of the plurality of configurable object class types. A second machine learning recommendation is generated at 1816, the second machine learning recommendation including a configured configurable object of the configurable object class type, using a second machine learning model, the second machine learning model being different than the first machine learning model, trained using the values of the first type and values of the second type that are specific for the configurable object class type.

FIG. 19 presents a flowchart of a process 1900 of obtaining a recommended solution using a solution category model and a solution configuration model. At 1904, first user input is received requesting a solution recommendation for a solution category. At 1908, a solution category model is accessed. A plurality of recommended solutions are returned at 1912 in response to the accessing the solution category model. At 1916, second user input is received selecting a recommended solution of the plurality of recommended solutions to provide a selected solution. A solution configuration model defined for the selected solution is accessed at 1920. At 1924, at least one configuration of the selected solution using the solution configuration model is returned.

FIG. 20 is a flowchart of a process 2000 of training machine learning models with requirements data and configuration data and providing a response to a recommendation request using such models. At 2004, a first machine learning model is trained using a first data set including requirements data and configuration data for a plurality of solutions. A plurality of second machine learning models are trained at 2008 using a respective plurality of second data sets, where a respective second data set of the respective plurality of second data sets includes configuration data for a respective solution of the plurality of solutions. At 2012, a request for a solution configuration recommendation is received, the request for a solution configuration recommendation including an input set of requirements data. At least one result is generated at 2016 based at least in part on a first inference result obtained by submitting the input set of requirements data to the first machine learning model and second inference results obtained by submitting the input set of requirements data to a second machine learning model of the plurality of second machine learning models.

FIG. 21 presents a flowchart of a process 2100 of obtaining a response to a solution configuration request using a set of requirements attributes and a set of configuration attributes. At 2104, a first data object is defined providing a solutions category, the solutions category including a solutions category identifier. A plurality of second data objects providing respective solutions of the solutions category and including respective solution identifiers are defined at 2108. At 2112, a plurality of requirements attributes are defined for the solutions category. Respective configuration attribute sets for the respective solutions are defined at 2116, where a given configuration attribute set of the respective configuration attribute sets includes a plurality of configuration attributes.

At 2120, at least one requirements data set is created by receiving respective sets of requirement attribute values for at least a portion of plurality of requirements attributes. At least one configuration data set is created at 2124 by receiving respective sets of configuration attributes values for the respective configuration attributes sets for the respective solutions. At 2128, a solution configuration request is received, the solution configuration request including an input set of values for at least a portion of the plurality of requirements attributes. At least one response to the solution configuration request is provided at 2132, the at least one response being selected based at least in part of the at least one requirements data set and the at least one configuration data set.

FIG. 22 is a flowchart of a process 2200 of obtaining recommended configuration values for a configurable object associated with a particular solution subcategory of a solutions category using a machine learning model trained with training data for a plurality of solution subcategories. A solutions category is defined at 2204. At 2208, a plurality of solution subcategories within the solutions category are defined. A plurality of configurable objects are assigned to respective solution subcategories of the plurality of solution subcategories at 2212. At 2216 a recommendation request is received that includes a set of input values. A recommendation response to the recommendation request is provided at 2220, the recommendation response including configuration attribute values for configuration attributes of a configurable object of the plurality of configurable objects determined using at least one machine learning model trained with training data for the plurality of solution subcategories.

FIG. 23 provides a flowchart of a process 2300 of defining a machine learning model that can be used in a recommendation process. At 2304, first user input is received defining a data object class. Second user input is received at 2308 defining a plurality of subclass data objects for the data object class. At 2312, third user input defining a set of requirements fields for the data object class is received. Fourth user input defining a set of configuration fields for subclass data objects of the plurality of subclass data objects is received at 2316. At 2320, a data model including the data object class and the set of requirements fields and the plurality of subclass data objects including the set of configuration fields is stored. Fifth user input identifying at least a first training data set including requirements field values is received at 2324. At 2328, sixth user input is received identifying at least a second training data set including configuration fields values. At least seventh user input to train a machine learning model using at least the at least a first training data set and the at least a second training data set is received at 2332. At 2336, a first machine learning algorithm is trained with the at least the at least a first training data set and at least a first portion of the at least a second training data set to provide a first machine learning model. Eighth user input to deploy the first machine learning model is received at 2340. At 2344, the first machine learning model is deployed in response to receiving the eighth user input.

Example 11—Computing Systems

Figure 24:
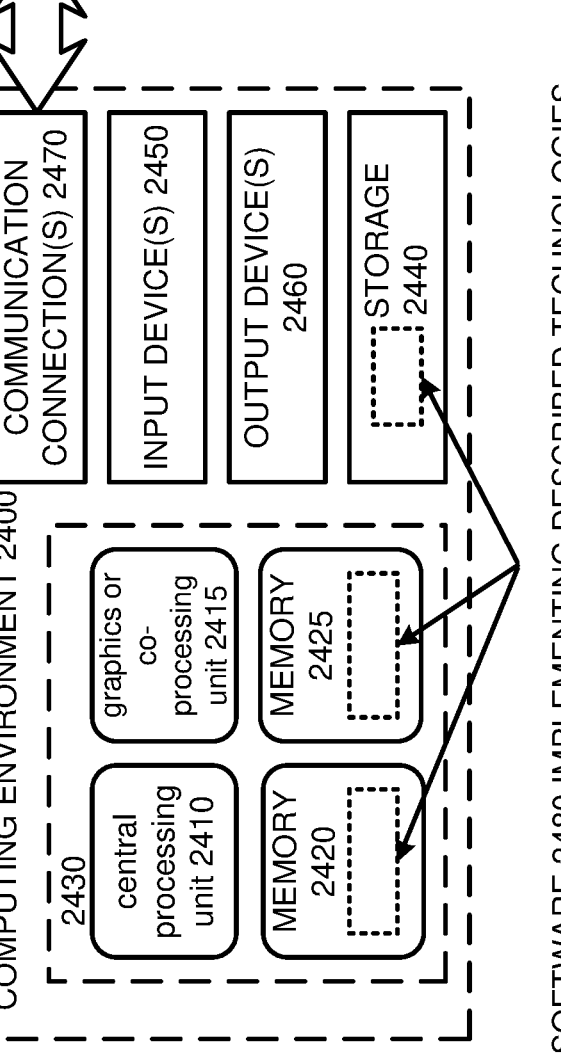
FIG. 24 is a diagram of an example computing system in which some described embodiments can be implemented.

FIG. 24 depicts a generalized example of a suitable computing system 2400 in which the described innovations may be implemented. The computing system 2400 is not intended to suggest any limitation as to scope of use or functionality of the present disclosure, as the innovations may be implemented in diverse general-purpose or special-purpose computing systems.

With reference to FIG. 24, the computing system 2400 includes one or more processing units 2410, 2415 and memory 2420, 2425. In FIG. 24, this basic configuration 2430 is included within a dashed line. The processing units 2410, 2415 execute computer-executable instructions, such as for implementing technologies described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 may be volatile memory (e.g., registers, cache, RAM), non-volatile memory (e.g., ROM, EEPROM, flash memory, etc.), or some combination of the two, accessible by the processing unit(s) 2410, 2415. The memory 2420, 2425 stores software 2480 implementing one or more innovations described herein, in the form of computer-executable instructions suitable for execution by the processing unit(s) 2410, 2415. The memory 2420, 2425, may also store database data.

A computing system 2400 may have additional features. For example, the computing system 2400 includes storage 2440, one or more input devices 2450, one or more output devices 2460, and one or more communication connections 2470, including input devices, output devices, and communication connections for interacting with a user. An interconnection mechanism (not shown) such as a bus, controller, or network interconnects the components of the computing system 2400. Typically, operating system software (not shown) provides an operating environment for other software executing in the computing system 2400, and coordinates activities of the components of the computing system 2400.

The tangible storage 2440 may be removable or non-removable, and includes magnetic disks, magnetic tapes or cassettes, CD-ROMs, DVDs, or any other medium which can be used to store information in a non-transitory way, and which can be accessed within the computing system 2400. The storage 2440 stores instructions for the software 2480 implementing one or more innovations described herein.

The input device(s) 2450 may be a touch input device such as a keyboard, mouse, pen, or trackball, a voice input device, a scanning device, or another device that provides input to the computing system 2400. The output device(s) 2460 may be a display, printer, speaker, CD-writer, or another device that provides output from the computing system 2400.

The communication connection(s) 2470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 25:
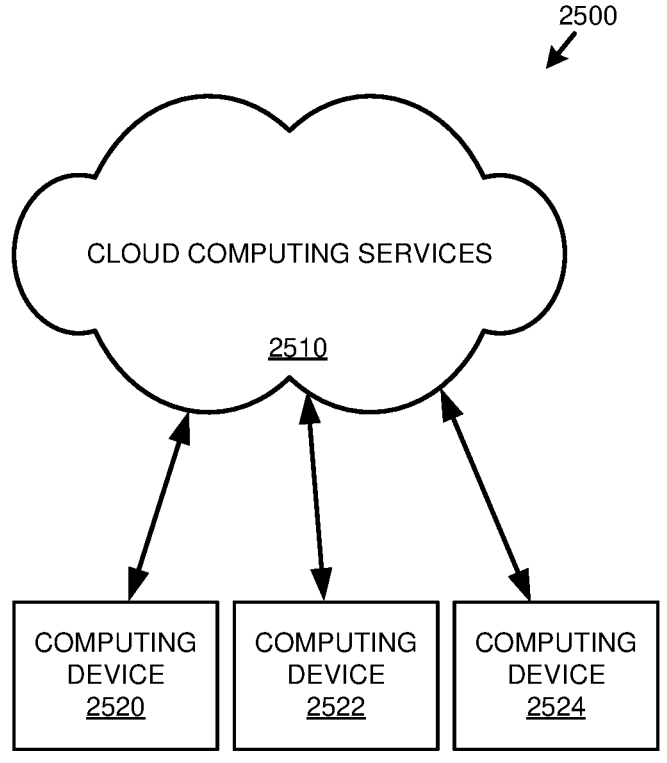
FIG. 25 is an example cloud computing environment that can be used in conjunction with the technologies described herein.

FIG. 25 depicts an example cloud computing environment 2500 in which the described technologies can be implemented. The cloud computing environment 2500 comprises cloud computing services 2510. The cloud computing services 2510 can comprise various types of cloud computing resources, such as computer servers, data storage repositories, networking resources, etc. The cloud computing services 2510 can be centrally located (e.g., provided by a data center of a business or organization) or distributed (e.g., provided by various computing resources located at different locations, such as different data centers and/or located in different cities or countries).

The cloud computing services 2510 are utilized by various types of computing devices (e.g., client computing devices), such as computing devices 2520, 2522, and 2524. For example, the computing devices (e.g., 2520, 2522, and 2524) can be computers (e.g., desktop or laptop computers), mobile devices (e.g., tablet computers or smart phones), or other types of computing devices. For example, the computing devices (e.g., 2520, 2522, and 2524) can utilize the cloud computing services 2510 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 24, computer-readable storage media include memory 2420 and 2425, and storage 2440. The term computer-readable storage media does not include signals and carrier waves. In addition, the term computer-readable storage media does not include communication connections (e.g., 2470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one hardware processor;

at least one memory coupled to the at least one hardware processor; and one or more computer-readable storage media comprising computer-executable instructions that, when executed, cause the computing system to perform operations comprising:

defining a first data object providing a solutions category, the solutions category comprising a solutions category identifier;

defining a plurality of second data objects providing respective solutions of the solutions category and comprising respective solution identifiers;

defining a plurality of requirements attributes for the solutions category;

defining respective configuration attribute sets for the respective solutions, a given configuration attribute set of the respective configuration attribute sets comprising a plurality of configuration attributes;

creating at least one requirements data set by receiving respective sets of requirement attribute values for at least a portion of the plurality of requirements attributes;

creating at least one configuration data set by receiving respective sets of configuration attributes values for the respective configuration attributes sets for the respective solutions;

receiving a solution configuration request, the solution configuration request comprising an input set of values for at least a portion of the plurality of requirements attributes; and providing at least one response to the solution configuration request, the at least one response being selected based at least in part of the at least one requirements data set and the at least one configuration data set.

2. The computing system of claim 1, the operations further comprising:

associating respective sets of a plurality of configurable objects with the respective solutions;

wherein configurable objects associated with a respective solution have the respective configuration attribute set for the respective solution, but where configuration attributes of the respective configuration attribute sets differ at least in part from configuration attributes of another solution of the respective solutions.

3. The computing system of claim 1, the operations further comprising:

defining a profile data object; and assigning a value of a first attribute of the profile data object to the solutions category identifier.

4. The computing system of claim 3, the operations further comprising:

in a profile data model comprising the profile data object, assigning a value identifying at least a first training data set to a second attribute of the profile data object or of another data object of the profile data model, the at least a first training data set comprising values for at least a portion of the plurality of requirements attributes and configuration attribute values for configuration attribute sets of the respective solutions.

5. The computing system of claim 4, the operations further comprising:

training a first machine learning algorithm at least in part using the at least a first training data set to provide a first trained model.

6. The computing system of claim 5, the operations further comprising:

assigning a value identifying the first trained model to a third attribute of the profile data object or another data object of the profile data model.

7. The computing system of claim 6, the operations further comprising training a second machine learning algorithm, the second machine learning algorithm being the first machine learning algorithm or a machine learning algorithm other than the first machine learning algorithm, at least in part using the at least a first training data set to provide a plurality of second trained models, wherein respective trained models of the plurality of second trained models correspond to models trained using configuration attributes of the at least a first training data set specific to a respective solution.

8. The computing system of claim 7, the operations further comprising:

assigning values identifying the plurality of second trained models to at least a fourth attribute of the profile data object or another data object of the profile data model.

9. The computing system of claim 1, the operations further comprising:

mapping the plurality of requirements attributes to respective elements or attributes of a file or data object comprising the requirement attribute values.

10. The computing system of claim 1, the operations further comprising:

mapping configuration attributes of the respective configuration attributes set to respective elements or attributes of a file or data object comprising the configuration attribute values.

11. The computing system of claim 1, the operations further comprising:

receiving a selection of a plurality of configurable objects, the plurality of configurable objects comprising a plurality of attributes, the plurality of attributes comprising configuration attributes of the respective configuration attribute sets;

wherein defining respective configuration attribute sets for the respective solutions comprises retrieving at least a portion of configuration attributes from respective definitions of the plurality of configurable objects.

12. The computing system of claim 11, wherein creating at least one configuration data set comprises querying one or more relational database tables comprising instances of one or more of the plurality of configurable objects.

13. A method, implemented in a computing system comprising at least one hardware processor and at least one memory coupled to the at least one hardware processor, the method comprising:

defining a solutions category;

defining a plurality of solution subcategories within the solutions category;

assigning a plurality of configurable objects to respective solution subcategories of the plurality of solution subcategories;

receiving a recommendation request comprising a set of input values; and providing a recommendation response to the recommendation request, the recommendation response comprising configuration attribute values for configuration attributes of a configurable object of the plurality of configurable objects determined using at least one machine learning model trained with training data for the plurality of solution subcategories.

14. The method of claim 13, further comprising:

receiving a request to create a training data set for the solutions category;

identifying configuration attributes for a plurality of configurable object associated with the solutions category; and retrieving values for the configuration attributes by performing a query of one or more data objects.

15. The method of claim 13, further comprising:

defining a plurality of requirements attributes, wherein the training data comprises values for the plurality of requirements attributes.

16. The method of claim 15, further comprising:

extracting requirements attribute values by parsing unstructured data comprising the requirements attribute values.

17. One or more non-transitory computer-readable storage media comprising:

computer-executable instructions that, when executed by a computing system comprising at least one hardware processor and at least one memory coupled to the at least one hardware processor, cause the computing system to define a solutions category;

computer-executable instructions that, when executed by the computing system, cause the computing system to define a plurality of solution subcategories within the solutions category;

computer-executable instructions that, when executed by the computing system, cause the computing system to assign a plurality of configurable objects to respective solution subcategories of the plurality of solution subcategories;

computer-executable instructions that, when executed by the computing system, cause the computing system to receive a recommendation request comprising a set of input values; and computer-executable instructions that, when executed by the computing system, cause the computing system to provide a recommendation response to the recommendation request, the recommendation response comprising configuration attribute values for configuration attributes of a configurable object of the plurality of configurable objects determined using at least one machine learning model trained with training data for the plurality of solution subcategories.

18. The one or more non-transitory computer-readable storage media of claim 17, further comprising:

computer-executable instructions that, when executed by the computing system, cause the computing system to receive a request to create a training data set for the solutions category;

computer-executable instructions that, when executed by the computing system, cause the computing system to identify configuration attributes for a plurality of configurable object associated with the solutions category; and computer-executable instructions that, when executed by the computing system, cause the computing system to retrieve values for the configuration attributes by performing a query of one or more data objects.

19. The one or more non-transitory computer-readable storage media of claim 17, further comprising:

computer-executable instructions that, when executed by the computing system, cause the computing system to define a plurality of requirements attributes, wherein the training data comprises values for the plurality of requirements attributes.

20. The one or more non-transitory computer-readable storage media of claim 19, further comprising:

computer-executable instructions that, when executed by the computing system, cause the computing system to extract requirements attribute values by parsing unstructured data comprising the requirements attribute values.

\* \* \* \* \*